(12) United States Patent
Watson et al.

(10) Patent No.: US 8,213,418 B2
(45) Date of Patent: *Jul. 3, 2012

(54) PROVIDING PACKET-BASED MULTIMEDIA SERVICES VIA A CIRCUIT BREAKER

(75) Inventors: Mark Watson, London (GB); Richard Bodin, Montigny le Bretonneux (FR); Michael Leeder, Slttsville (CA)

(73) Assignee: Rockstar Bidco LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,062

(22) Filed: May 16, 2011

(65) Prior Publication Data

US 2011/0268110 A1 Nov. 3, 2011

Related U.S. Application Data

(63) Continuation of application No. 10/843,402, filed on May 11, 2004, now Pat. No. 7,961,714, which is a continuation-in-part of application No. 10/630,999, filed on Jul. 30, 2003, now Pat. No. 7,746,849.

(51) Int. Cl.
  *H04L 12/66* (2006.01)
(52) U.S. Cl. ............ 370/352; 370/401; 370/522
(58) Field of Classification Search ......... 370/325, 370/354, 401, 410; 455/450
  See application file for complete search history.

*Primary Examiner* — Jianye Wu
*Assistant Examiner* — Mon Cheri Davenport
(74) *Attorney, Agent, or Firm* — Barnes & Thornburg LLP

(57) ABSTRACT

A packet-based multimedia service is provided to a terminal in a network. A packet signaling connection is established between the terminal and the network. Signaling information for the multimedia service is transferred via the packet signaling connection using Session Initiation Protocol (SIP) or a similar protocol. A circuit bearer connection is also established with the terminal. Data for the multimedia service is transferred via the circuit bearer connection. This allows the data to be carried across networks which do not support the required QoS functionality for the packet-based service, or which cannot efficiently carry packet-based data. The circuit bearer connection can be established by a network entity or by the terminal. The circuit bearer can be interworked to a packet-switched bearer at some point in the network, such as at a gateway, so as to provide a remote party with the appearance that a fully packet-switched connection is being used.

15 Claims, 21 Drawing Sheets

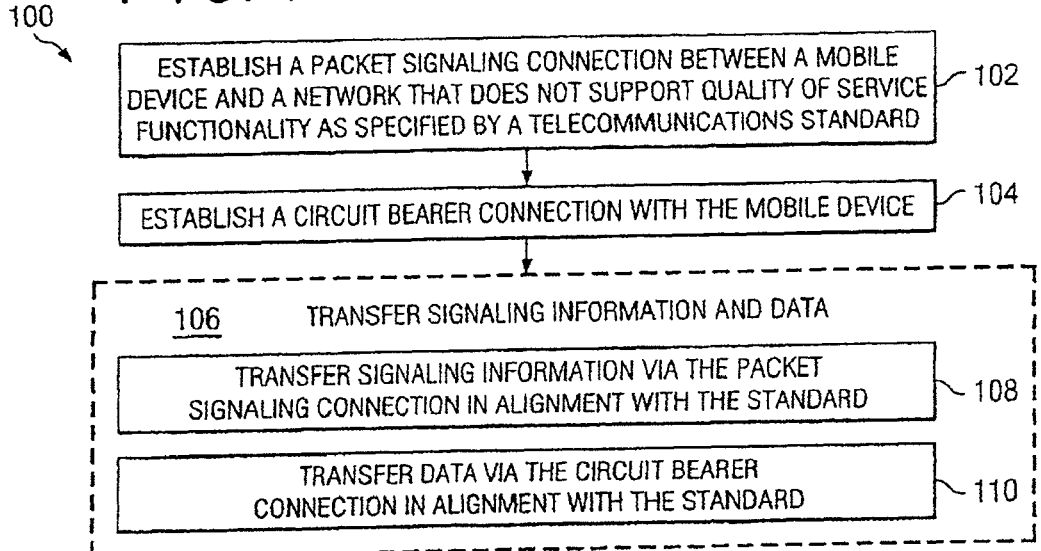
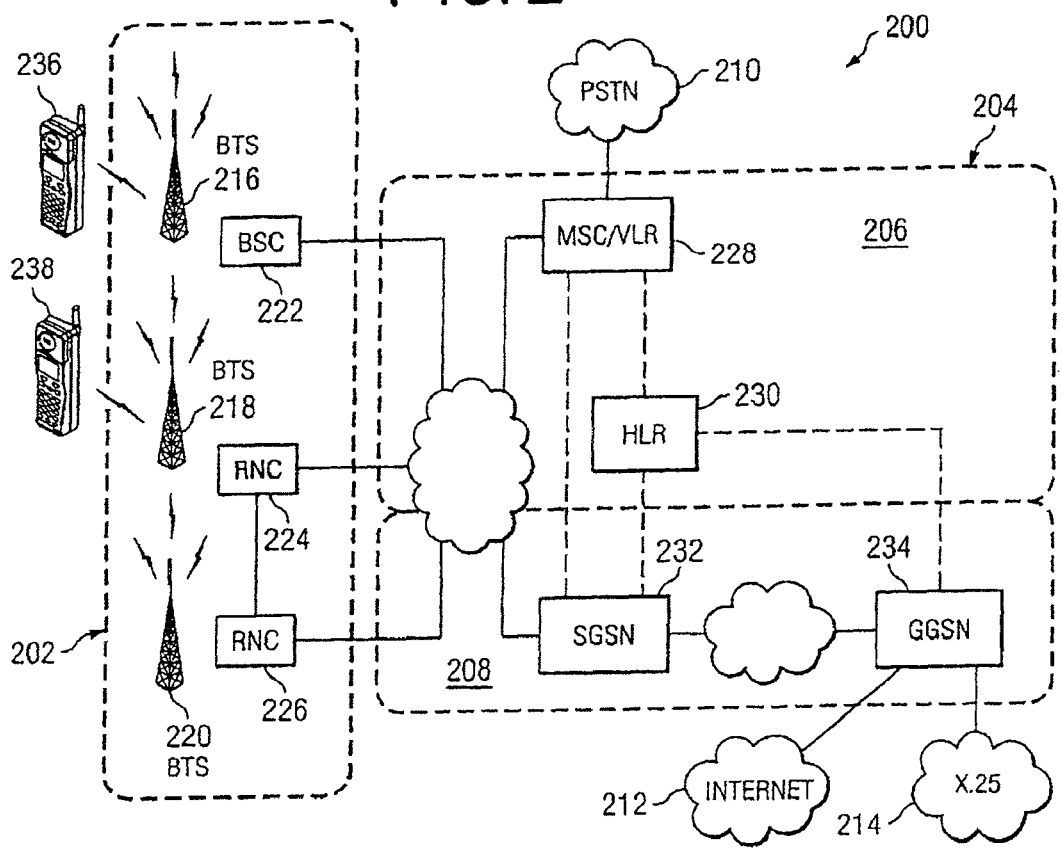

PROVIDING PACKET-BASED MULTIMEDIA SERVICES VIA A CIRCUIT BREAKER

RELATED APPLICATION

This application is a continuation of U.S. patent application Ser. No. 10/843,402, filed May 11, 2004, which is a continuation-in-part of U.S. patent application Ser. No. 10/630,999, filed Jul. 30, 2003, now U.S. Pat. No. 7,746,849, issued Jun. 29, 2010.

BACKGROUND OF THE INVENTION

The present disclosure relates generally to supporting packet-based multimedia services in a communications system.

Telecommunications systems, such as Universal Mobile Telecommunications System (UMTS) wireless networks, are evolving into systems that may carry both voice and data traffic via fixed, wireless, and satellite networks. Part of this evolution includes developing and providing packet frameworks for the delivery of IP based, real-time, conversational, multimedia services. For example, an IP multimedia subsystem (IMS) standard has been defined as part of a third generation partnership project (3GPP) to provide such services.

Standards (such as IMS) that address the delivery of multimedia services via a packet based network generally require quality of service (QoS) mechanisms that are intended to ensure a certain level of quality. However, most wireless packet networks require relatively substantial enhancements before such QoS mechanisms can be provided, which slows down the implementation of the associated standards. For example, while IMS provides a framework to support the delivery of multimedia services in a wireless network, most wireless networks need upgrades to their access/radio layers, as well as to their packet core/general packet radio service (GPRS) subsystems before IMS can be properly supported. Implementing these upgrades may involve a considerable amount of time and expense, as the upgrades will need to be developed, deployed and tested.

Accordingly, what is needed is an improved system and method to provide for the delivery of IP based, real-time, conversational, multimedia services. It is desirable to deliver these services to mobile devices via networks that may not support QoS mechanisms specified for the delivery of such services, or networks which are not capable of efficiently carrying IP based traffic.

SUMMARY OF THE INVENTION

Accordingly, an aspect of the present invention provides a method for providing a packet-based multimedia service to a terminal in a network. A packet signaling connection is established between the terminal and the network. A circuit bearer connection is established between the terminal and the network. Signaling information for the multimedia service is transferred via the packet signaling connection and data for the multimedia service is transferred via the circuit bearer connection.

Using a circuit bearer connection to carry data for the packet-based multimedia service has several advantages. Where the packet-switched capabilities of a network do not support the quality of service (QoS) demanded by the multimedia service, the circuit bearer can be used to ensure that data is carried in a manner that meets the required QoS. Alternatively, where data for the multimedia service can be carried more efficiently by the circuit bearer, it is advantageous to use a circuit bearer to carry the data, even if the packet-switched capabilities of the network would support the required QoS. An example of this is where the multimedia service is a voice-based service. Many networks are optimised to efficiently carry voice data, and it is more efficient to carry voice data over a circuit bearer connection rather than packing the voice data into IP packets where voice-specific optimizations may not be applied.

The circuit bearer can be used on just one leg of the total path between the terminal and a called party. The circuit bearer can be local to an end-user terminal and is treated simply as a bearer for the first 'hop' of a Media Component in a Session Initiation Protocol (SIP) session. The circuit bearer connection can be established by a network entity or by the terminal. Preferably, the circuit bearer is interworked to a packet-switched bearer at some point in the network, such as at a gateway, so as to provide a remote party with the appearance that a fully packet-switched connection is being used. Thus, the remote party can continue to use the normal packet-switched protocols for signalling and bearer traffic.

The method can be used at the start of a call. The method can also be used part-way through an existing call to transfer an ongoing packet-based call (e.g. a SIP VoIP call) to the circuit-switched domain over at least one leg of the call. This situation can arise if a mobile user moves away from an area where coverage is provided by a wireless local area network (WLAN) or 3G network, which supports a packet-switched bearer connection, to an area where coverage is provided by an alternative network which is not optimised to support a packet-switched bearer connection.

In one embodiment, a method is provided for providing a packet-based multimedia service to a mobile device in a network. The service is defined by a telecommunications standard, and the network does not support efficient packet quality of service (QoS) functionality as required by the standard. The method comprises establishing a packet signaling connection and a circuit bearer connection between the mobile device and network. Signaling information for the multimedia service is transferred via the packet signaling connection in alignment with the standard. Data for the multimedia service is transferred via the circuit bearer connection in alignment with the standard. This provides the multimedia service to the mobile device via the network as specified by the standard, even though the network does not support the required QoS functionality. The circuit bearer is used in a manner which complies with normal circuit bearer standards and so there is no requirement to change the way in the circuit network operates.

In addition to the data which is carried over the circuit bearer connection, other data for the multimedia service can be carried via a packet-switched connection. Typically, this is data which does not have strict QoS requirements, or data which is best carried in packet form rather than via a circuit bearer, such as Instant Messaging.

The invention is particularly useful with wireless communications systems which lack the packet QoS functionality required by a service or which cannot efficiently carry the data in packet form, although it can equally be applied to any situation in which a terminal has access to both a packet-based connection (such as a low-bandwidth IP connection) and also a circuit bearer (such as a telephony) connection.

Further aspects of the invention relate to methods of operating a control entity at a terminal and to a method of operating a control entity in the network. Still further aspects of the invention relate to a control entity which implements these methods.

The functionality described here can be implemented in software, hardware or a combination of these. Accordingly, further aspects of the invention provide a computer program product for implementing any combination of the steps of the methods according to the invention. It will be appreciated that the software can be installed on the host apparatus (e.g. a network entity such as an application server or the terminal) at any point during the life of the equipment. The software may be stored on an electronic memory device, hard disk, optical disk or other machine-readable storage medium. The software may be delivered as a computer program product on a machine-readable carrier or it may be downloaded directly to the host via a network connection.

BRIEF DESCRIPTION OF THE DRAWINGS

FIG. 1 shows a flowchart of an exemplary method for providing multimedia services to a mobile device using a circuit bearer;

FIG. 2 shows an exemplary UMTS wireless network in which the method of FIG. 1 may be implemented;

DETAILED DESCRIPTION

Figure 3:
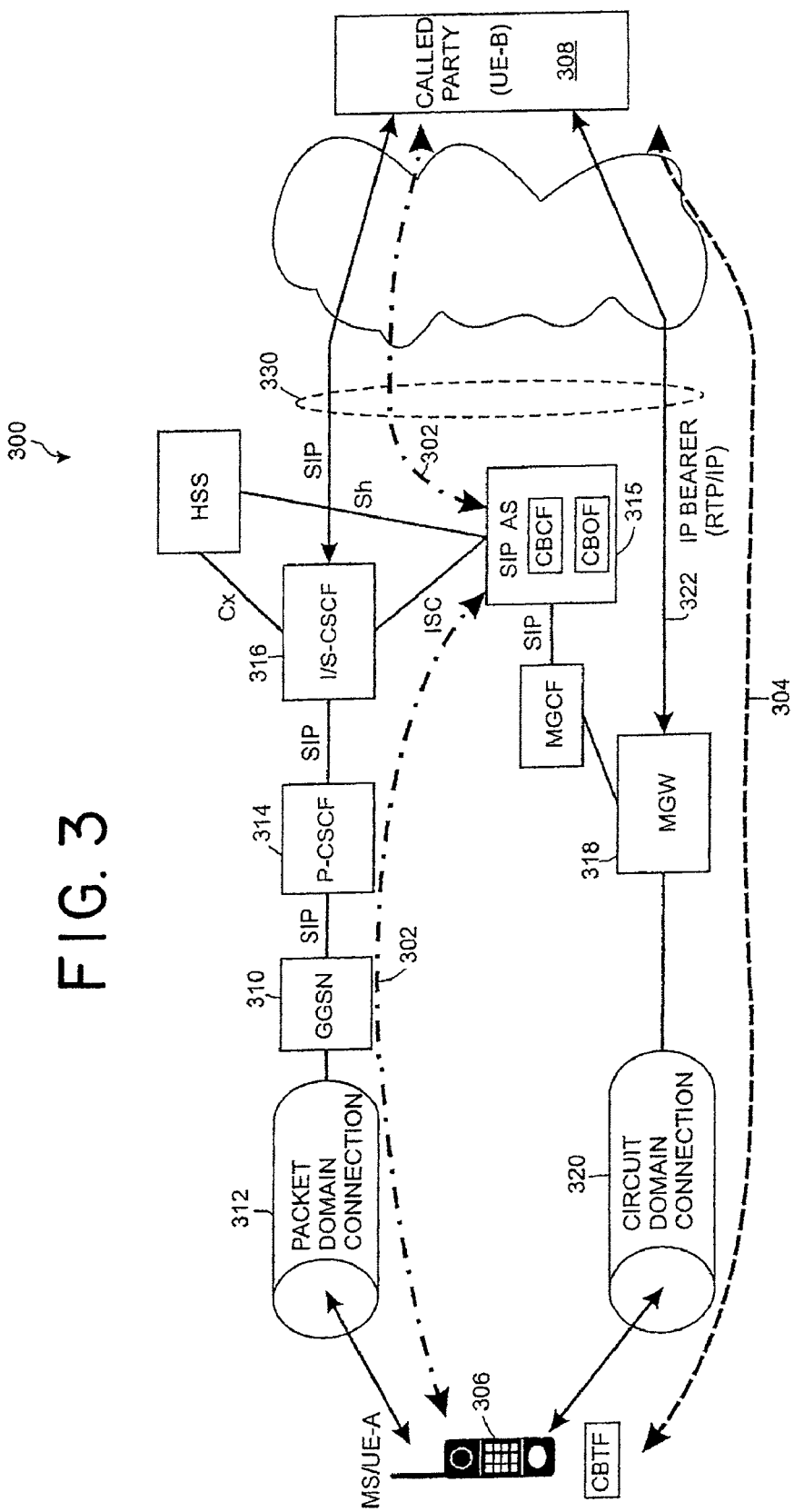
FIGS. 3 and 4 show embodiments of an architecture that may be used to implement the method of FIG. 1 within the system of FIG. 2.

The present disclosure relates generally to supporting Internet protocol (IP) based multimedia services using a combination of an IP connection and a circuit bearer. While the main embodiments describe the application to wireless communications systems it could equally apply to any situation in which there exists a packet-based connection (such as a low-bandwidth IP connection) and also a circuit bearer (such as a telephony) connection. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used to provide a packet-based multimedia service to a mobile device in a network. As will be described later in greater detail, the service is defined by a telecommunications standard that specifies quality of service (QoS) functionality for packet-based data transfers. However, the network does not efficiently support such QoS functionality. Accordingly, the method 100 may be used for providing the multimedia service in accordance with the standard on the non-compliant network.

In step 102, a packet signaling connection may be established between the mobile device and network. This signaling connection may use, for example, a signaling protocol that provides call setup, routing, authentication, and other messages to endpoints within an IP network. In step 104, a circuit bearer connection is established between the mobile device and network. Because the circuit bearer and packet signaling connections exist simultaneously, the mobile device should have functionality that supports this dual connection operation.

In step 106, signaling information and data associated with the multimedia service may be transferred between the network and the mobile device. For example, in step 108, signaling information for the multimedia service may be transferred via the packet signaling connection in alignment with the standard. In step 110, data for the multimedia service may be transferred via the circuit bearer connection in alignment with the standard. It is understood that steps 108 and 110 may occur simultaneously, as signaling and data transfer may occur throughout a communication session. Accordingly, the method 100 enables the multimedia service to be provided to the mobile device via the network as specified by the standard, even though the network does not support the specified QoS functionality.

Referring now to FIG. 2, a telecommunications network 200 illustrates a system in which the method 100 described in reference to FIG. 1 may be practised. In the present example, the network 200 is a wireless network that supports both voice and data packet communications using General Packet Service Radio (GPRS) and/or Universal Mobile Telecommunications System (UMTS) technologies.

The network 200 comprises a Radio Access Network (RAN) 202 and a core network 204. The core network 204 further comprises a circuit domain 206 and a packet domain 208. Other networks may be accessible to the network 200, such as a Public Switch Telephone Network (PSTN) 210 (connected to the circuit domain 206), Internet 212, and an X.25 network 214 (both connected to the packet domain 208).

The RAN 202 includes a plurality of cells (not shown) serviced by base transceiver stations (BTS) 216, 218, and 220. The BTS 216 is connected to a base station controller (BSC) 222 to provide a second-generation wireless network. The BTSs 218, 220 are accessible to radio network controllers (RNCs) 224, 226, respectively, to provide a third-generation wireless network. A mobile switching center/visitor location register (MSC/VLR) 228 may be used to connect the core network 204 with other networks, such as the PSTN 210. A home location register (HLR) 230 may be accessible to the MSC/VLR 228 and also to a serving GPRS support node (SGSN) 232 and a gateway GPRS support node (GGSN) 234 in the packet domain 208.

The network 200 enables at least one mobile device 236 to establish a communication session with another device via the BTS 216. For example, a request to establish a communication session with the mobile device 236 may be directed by the MSC/VLR 228 to (1) a second mobile device 238, (2) a voice terminal (not shown) coupled to the PSTN 210, or (3) a data terminal (not shown) coupled elsewhere to the telecommunications network 200. For example, if the communication session is a circuit data transfer session, the request may be to connect the mobile device 236 to a computer or other data device via the network 200. If the communication is a packet data transfer session, the request may be routed through the SGSN 232, the GGSN 234, and to the Internet 212. It is noted that the mobile devices 236 and 238, while illustrated as mobile telephones, may be any mobile device capable of communicating via the network 200. Furthermore, the mobile devices 236, 238 may be capable of simultaneous circuit/data (e.g., packet) connections. It is understood that the network 200 is for purposes of illustration and the present disclosure may be equally applicable to other networks.

Referring now to FIG. 3, an architecture 300 may be used to implement a call session representing the method 100 of FIG. 1. In the present example, the call session may be requested by the network via a media gateway or by an end user, such as a mobile station. The session is to provide IP based, real-time, conversational, multimedia services. For example, the services may be provided using an IP multimedia subsystem (IMS), which is defined as part of a third generation partnership project (3GPP). Providing these services in compliance with 3GPP may require certain QoS mechanisms that may not exist in some networks, such as QoS for packet and access layers associated with the telecommunications network 200 of FIG. 2. Accordingly, the architecture 300 enables the use of 3GPP IMS services prior to the introduction of the IP QoS mechanisms as follows, although it is understood that the present disclosure may also be implemented in a network in which such QoS mechanisms do exist.

The Session Initiation Protocol (SIP) has been adopted by the 3GPP IMS for the transport of multimedia services. SIP messaging is based on a request-response paradigm and may be divided into SIP request messages and SIP response messages. SIP request messages include INVITE (which initiates a call or changes call parameters), ACK (which confirms a final response for INVITE), BYE (which terminates the call), CANCEL (which cancels an ongoing INVITE), OPTIONS (which queries a server about its capabilities), REGISTER (which registers with the location service), and INFO (which sends in-progress information). The SIP response messages may contain response codes such as 100 (continue), 180 (ringing), 200 (OK), 302 (moved temporarily), 401 (unauthorized), and 600 (busy). The use of SIP enables flexibility in the call session, and may also serve to align the call session with known standards, such as 3GPP IMS. A part of SIP is the Session Description Protocol (SDP) which is used, inter alia, to declare capabilities of network entities.

The architecture 300 comprises a signaling path 302 and a bearer path 304 between a mobile station (MS) 306 (which will also be called a User Equipment UE-A) and another party 308 (which will also be called a User Equipment UE-B). Mobile station 306 can be a dual mode mobile phone which is capable of simultaneous circuit and data connections. The MS 306 is connected to a GGSN 310 via a packet domain connection 312 (e.g., using dynamic host configuration protocol (DHCP), domain name service (DNS), etc.) The GGSN 310 is connected to a Proxy Call Session Control Function (P-CSCF) 314 which, in turn, may communicate with a Serving Call Session Control Function (S-CSCF) 316. It is understood that other network entities may be used, such as an Interrogating Call Session Control Function (I-CSCF) (shown with the S-CSCF 316). The P-CSCF 314 may provide a point of contact in a visited network after the MS 306 is registered in the network. The S-CSCF 316 may be used to identify privileges associated with the MS 306, as well as for selecting and providing access to a home network application server (315). The I-CSCF (also 316) may be used to locate the S-CSCF and hide the S-CSCF's network architecture. The P-CSCF 314 and I/S-CSCF 316 may be viewed as functional blocks that may be located on any of a plurality of network nodes, including within the GGSN 310. The I/S-CSCF 316 communicates with the called party 308 via SIP messaging. A SIP Application Server (AS) 315 supports various SIP services. The SIP AS is connected to the I/S-CSCF via an ISC interface which carries SIP messaging. A Home Subscriber Server (HSS) acts as a repository for data relating to subscribers, including authentication information and information on the services that each subscriber is authorized to access. The I-CSCF and S-CSCF communicate with the HSS using the Cx interface, in order to obtain this information so that subscribers can be authenticated and authorized for access to the network and services. Similarly, the AS 315 communicates with the HSS using the Sh interface for the same purposes. A Media Gateway Control Function (MGCF) provides for routing of calls outside the IP Multimedia Subsystem. The MGCF communicates with SIP entities in the IMS (CSCFs) and also with call handling entities within the circuit switched network. It also communicates with a Media Gateway to control the mapping of user data (media) between IMS and Circuit Switched domains.

The MS 306 is also connected to a media gateway (MGW) 318 via a circuit domain connection 320. The MGW 318 can communicate with the called party (UE-B) 308 via an IP bearer path 322. In the present example, the MGW 318 converts the circuit-switched bearer traffic received from the MS 306 via the circuit domain connection 320 into IP packet based bearer traffic. The circuit-switched bearer 320 may be initiated by the MS 306 or by an intelligent node in the network, such as the MGW 318. As will be shown later in greater detail, the messaging used to establish the call session within the architecture 300 enables the session to accommodate later network changes, such as the implementation of QoS mechanisms. It is noted that the circuit domain connection 320 is used solely for bearer traffic to and from the MS 306, while signaling information is routed via the P-CSCF 314. Called party 308 (and any other entities to the right hand side of FIG. 3) see a conventional VoIP call 330. In the following description the provision of a Circuit Bearer connection for at least part of the bearer path between a calling party (306) and called party (308), as part of a SIP session, will be referred to as a SIP Circuit Bearer (SCB).

A fully packet-switched SIP service would firstly establish a connection between the MS 306 and called party 308 using SIP signalling, identifying both parties, such that data packets which carry data for the service can be routed across the network via an IP bearer. Where a SIP Circuit Bearer is used a part of the bearer path—in this case between the mobile device MS 306 and gateway MGW 318—is provided by a circuit-switched connection. As part of the SIP signalling, the called party UE-B 308 is provided with the address of the gateway MGW 318 so that data packets are correctly routed to the gateway 318 rather than the mobile device 306.

Three functional elements are added to a conventional network to support a SIP circuit bearer (SCB). Firstly, a Circuit Bearer Control Function (CBCF) performs third party call control to mediate between the SIP Circuit Bearer 320 and IP bearer 322. The CBCF sits in the signalling path 302 and presents the appearance of a standard SIP call using IP bearers 322 to the terminating SIP user agent (called party UE-B 308). It also instructs a Circuit Bearer Originating Function (CBOF), which may reside in the network or the terminal, to initiate a circuit bearer call 320.

Figure 4:
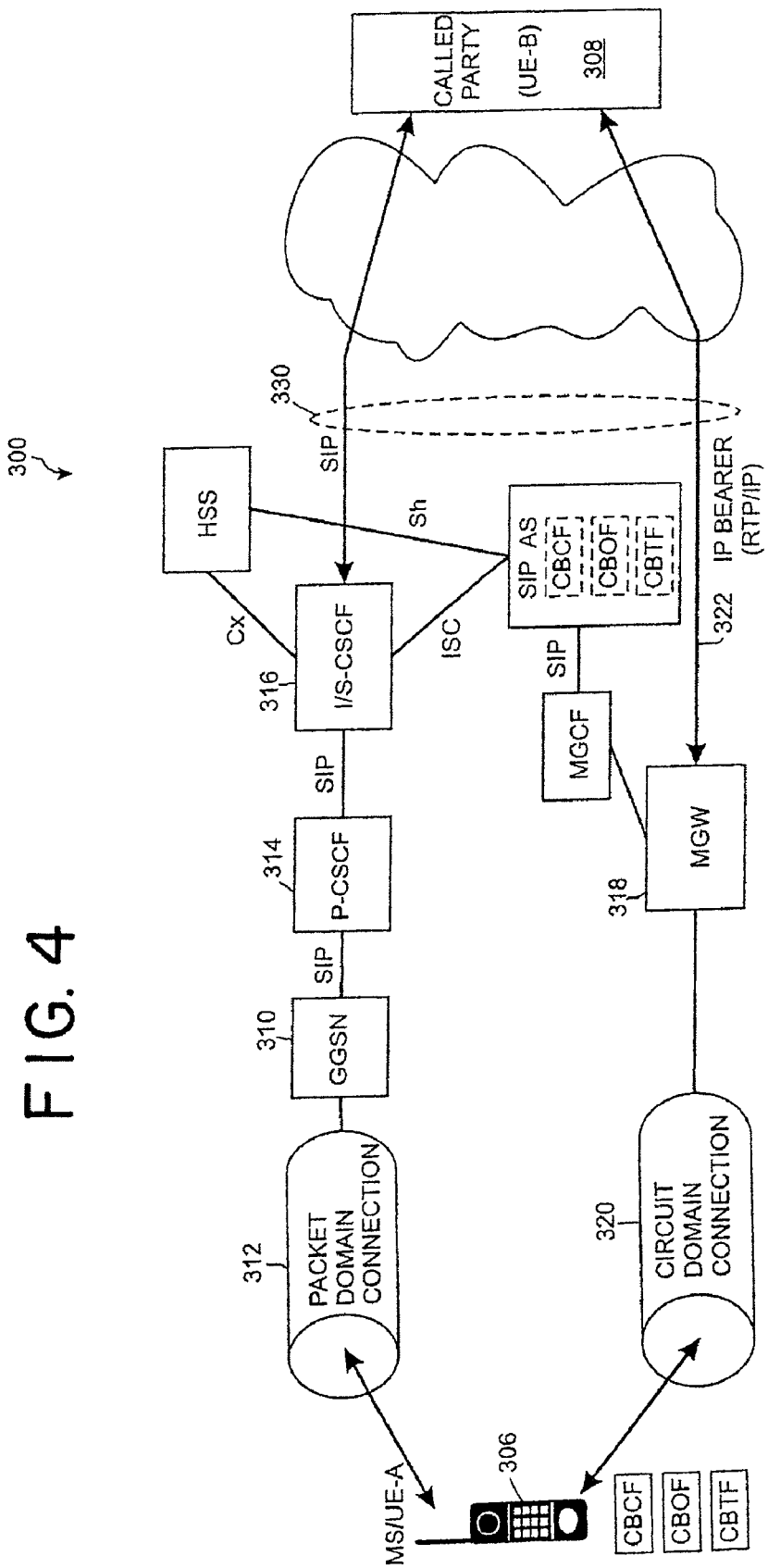

Secondly, a Circuit Bearer Originating Function (CBOF) originates the Circuit Bearer portion 320 of the call towards a telephone number (an E.164 number) provided by the CBCF. The CBCF may already be configured with the E.164 number (in the case that it is fixed as part of the network coordination) or the CBCF will have to obtain the number from the CBTF. If the CBOF is within the network, as shown in FIG. 3, (rather than at the client as shown in FIG. 4), then it will need to provide the IP address/port of the gateway MGW to the CBCF in order for the CBCF to provide them to the called party.

Finally, a Circuit Bearer Termination Function (CBTF) terminates the Circuit Bearer portion of the call. It can allocate a circuit number that can be used to route a call from the CBOF, receives the incoming circuit call and notifies the CBCF (if required). If the CBTF is in the network, then the "call" is routed through the MGW/MGCF (which turns it from a circuit call to a SIP call) and onwards to the CBTF. For compatibility reasons, it is desirable that the MGW/MGCF is not modified to provide any additional functionality specific to SIP Circuit Bearer, and just converts the call as it would any other call. The CBTF in this case will act as a terminating SIP User Agent.

There are various ways in which these functional elements can be added to the network. FIG. 3 shows a solution where most of the functionality is provided in the network. The call control (CBCF) and circuit bearer originating functions (CBOF) are provided in the network, and a convenient place for these is a SIP Application Server (AS) 315. The mobile device MS is modified to include a circuit bearer terminating function (CBTF) so that it can respond to a circuit bearer initiated by the network. FIG. 4 shows a solution where most (or all) of the functionality is provided at the terminal. The call control (CBCF) and circuit bearer originating and terminating functions (CBOF/CBTF) are part of the terminal. As a further alternative, both the network and terminal can have one or more of the CBCF, CBOF and CBTF functional elements. This allows either the terminal or network to control the SIP circuit bearer call, and either the terminal or network to establish the circuit bearer leg 320 of the call. Signalling messages (SDP) can indicate whether the terminal wishes to make or receive the Circuit Bearer call (or whether it doesn't care) and this can be negotiated between the network and terminal. If the terminal supports a CBCF, then it can indicate support for a standard VoIP media component within the Session Description (SDP). If this media component is accepted by the called party, the terminal will invoke the CBCF to establish the circuit bearer and obtain the VoIP parameters (address/port of the MGW) that need to be passed to the called party. In the case that the terminal supports CBTF or CBOF, then it can indicate that it supports SIP Circuit Bearer within the Session by including a separate media component with SCB parameters. The network may then invoke its own CBCF. If the network supports a network-based Circuit Bearer Control Function, then it is preferred that this is used to control the SCB. If the network does not have it's own Circuit Bearer Control Function (CBCF) then the terminal can detect this and perform the CBCF function itself.

It is preferable that a terminal supports the SIP Circuit Bearer mechanism in a manner which is transparent to the user such that a user is not made aware of the difference between a SIP Circuit Bearer call and a normal SIP call in any way. To achieve this, it is preferred that the terminal includes the following: standard 3GPP IMS call control capabilities; the ability to request SIP Circuit Bearer in its SDP, the ability to recognise a SIP Circuit Bearer request in incoming SDP; the ability to recognise and silently accept an incoming SIP Circuit Bearer call or to automatically make an outgoing SIP Circuit Bearer call; to associate a SIP Circuit Bearer Call with the corresponding SIP session in a transparent manner; and the ability to support simultaneous CS domain and PS domain connections.

Figure 5:
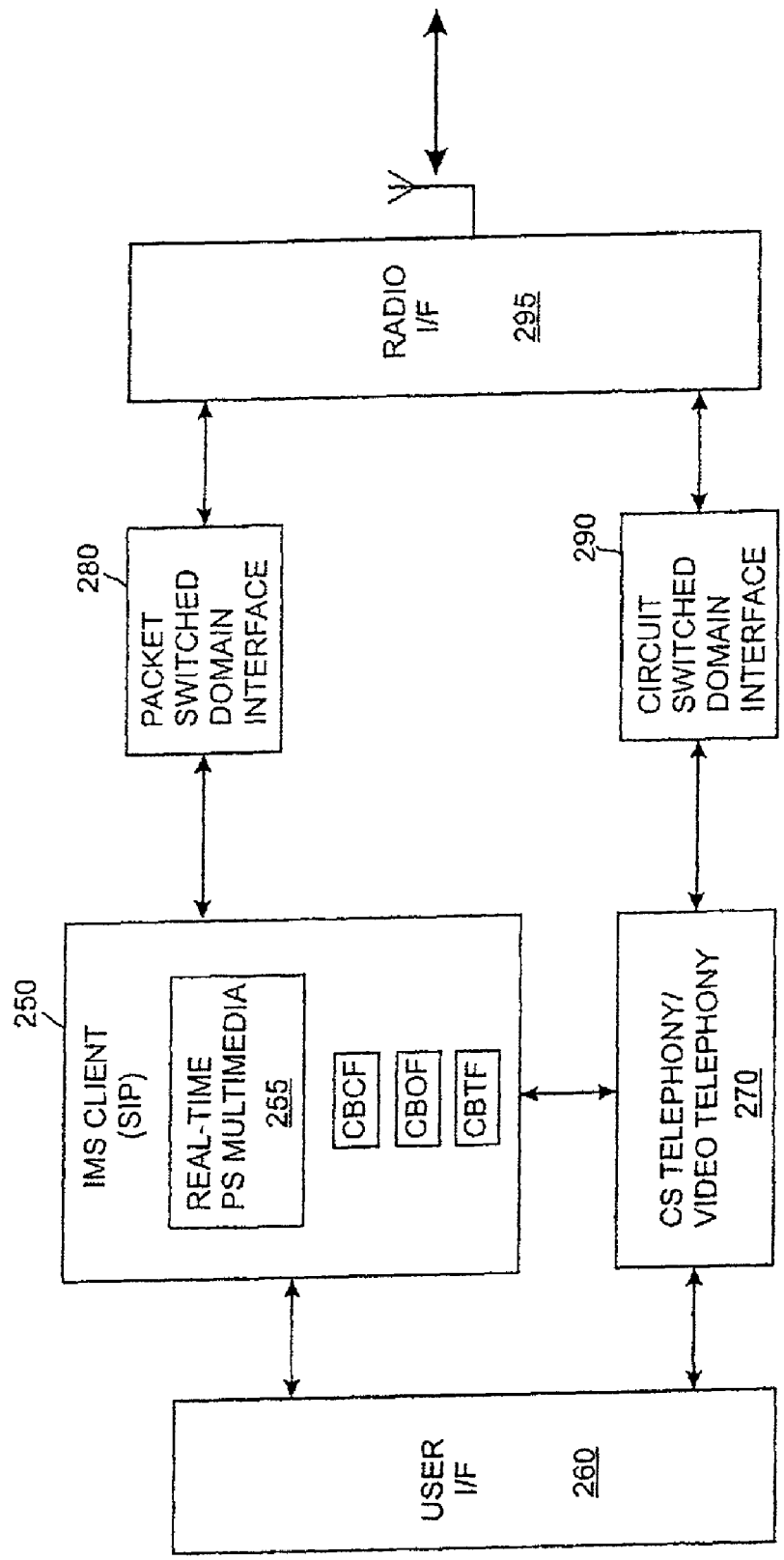
FIG. 5 shows a terminal for implementing the method according to the invention.

FIG. 5 shows the main parts of a terminal which is adapted to support SIP Circuit Bearer. An IMS Client 250 supports SIP signalling and real-time packet-switched multimedia services 255. The IMS Client 250 is connected to a packet-switched (PS) domain interface 280 which formats signals for transmission and reception along a PS connection. The IMS client 250 includes one or more of the CBCF, CBOF and CBTF functions described above to support the SIP Circuit Bearer. IMS Client 250 is connected to a circuit-switched telephony function and a circuit-switched domain interface 290, which allows the terminal to transmit and receive CS data over a CS connection when a SIP Circuit Bearer is required. Both the PS domain interface 280 and CS domain interface 290 connect to a radio interface 295 which includes conventional coding and modulation functions for transporting the PS and CS signals over a radio interface. A user interface 260 includes conventional features such as a microphone, loudspeaker, display and keypad. The functions of the IMS Client 250 and blocks 270, 280, 290, 295 are typically realised as software executed by a microprocessor, by a combination of hardware and software, or by dedicated processing equipment.

A number of different call flows will now be described to illustrate the various ways in which embodiments of the invention can operate. In each of these call flows it is assumed that the terminal is aware that a SIP Circuit Bearer (SCB) is required, i.e. the terminal knows that the current access system is not optimised for supporting native VoIP. All call flows begin with the terminal sending an INVITE message with the SCB SDP, requesting a SCB. If the terminal supports it's own CBCF then it will indicate in the SDP that it would like either a SCB connection or a normal VoIP connection—the 'normal VoIP' SDP is included because the terminal can convert this into a SIP Circuit Bearer by using it's own CBCF. There are four main possibilities:

1. The terminal has indicated that it accepts incoming SCB calls. The network detects the SCB SDP and invokes the Circuit Bearer Control Function. The network makes the CS call to the terminal and links it to the SIP session. The network provides information in the form of SDP of the Media Gateway to the far endpoint. This includes the IP address of the Media Gateway.
2. The terminal has indicated that it wishes to make an outgoing SCB call. The network detects the SCB SDP and invokes the Circuit Bearer Control Function. The network CBCF responds to the terminal with the E.164 number that should be used for the circuit bearer connection. The terminal makes the CB call and the CBTF in the network receives the call and forwards to the CBCF. The network CBCF then provides the SDP of the Media Gateway MGW to the far endpoint.

3. The network does not recognise the SCB SDP, i.e. the network does not have a CBCF, and the SDP is forwarded to the far endpoint, which also does not recognise it but accepts the VoIP part of the call. The calling terminal invokes it's own CBCF and the call flows continue as in (1) or (2) with the terminal performing the CBCF function and either CBOF or CBTF.

4. The network does not recognise the SCB SDP and it is forwarded to the far endpoint, which does recognise it. According to the preference indicated by the calling terminal, the called or calling terminal invokes a CBOF to establish a Circuit Bearer directly between the two endpoints. As the Circuit Bearer is established directly between CBOF and CBTF at the two endpoints there is no need for mediating between a Circuit Bearer and a VoIP connection and hence no need for a CBCF. A further possibility in this case is that the SCB parameters negotiated in the session description identify an already established CS domain call between the two endpoints. In this way, an IMS session can be established making use of a pre-existing CS domain call between the two users.

For simplicity, some network entities have been omitted from the call flows, such as the various CSCFs that signaling messages would be routed through. Where there is a network based CBCF, it is shown as an individual entity although it will, in reality, be provided at the P-CSCF, S-CSCF or SIP AS. The call flows are the same, although the discovery of information such as E.164 numbers may differ. The terminal UE-A has a CS domain subscription with a Mobile Station ISDN number (MSISDN)+447710875525. When the CBCF is network-based, it operates a full back-to-back User Agent, meaning that it acts as a SIP User Agent Server towards the originating SIP User Agent and as a SIP User Agent Client towards the terminating SIP User Agent, mediating between the two.

We consider the case that UE-A wants to use a SIP Circuit Bearer. This is transparent to UE-B in Cases 1-3. UE-B may also use SCB, in which case (for cases 1-3) the call flow for UE-B is essentially the mirror of that for UE-A. Messages that are tagged with an asterisk symbol "*" indicate that pre-conditions are not yet met. SDP extensions are required for describing a Circuit Bearer. These are outlined in the Appendix.

Figure 6:
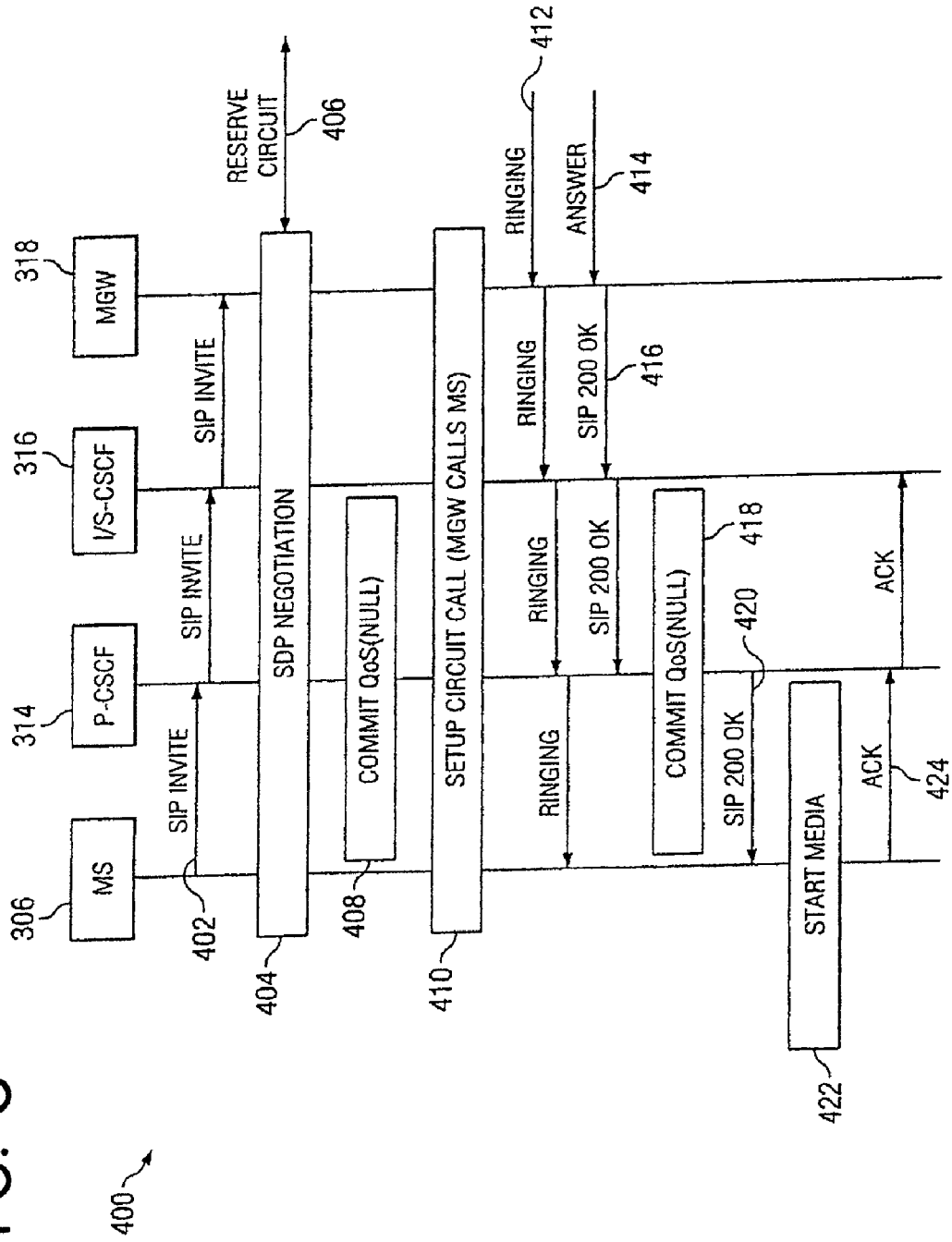
FIGS. 6 and 7 shows call flows of a call set-up in which a circuit bearer is requested by a network via a media gateway within the architecture of FIG. 3.

FIG. 6 generally shows a first call flow in which the network manages the call flow, and the network initiates the SCB. Data is carried over a first leg of the session by circuit domain connection 320. This may be accomplished by establishing a signaling PDP context between the MS 306 and the P-CSCF 314 (via the GGSN 310). SIP signaling then occurs between the MS 306 and the P-CSCF 314 to establish a call session. Network services may be executed using the S-CSCF 316, and a circuit bearer is requested to establish the circuit domain connection 320. A second leg of the connection is established to the other party 308 via the MGW 318 using either a packet or circuit connection. The MGW 318 then bridges both the first and second legs to connect the MS 306 and other party 308. In the call flow 400, the MGW 318 is used to establish the circuit domain connection 320. As shown in FIG. 6, the call flow 400 includes the MS 306, the P-CSCF 314, the I/S-CSCF 316, and the MGW 318. The call flow 400 relies heavily upon SIP messaging.

The call flow 400 begins in step 402 when the MS 306 sends a SIP INVITE message to the P-CSCF 314. The INVITE message includes an initial session description protocol (SDP) packet in the SIP INVITE message body. SDP is a protocol that may be used to indicate a multimedia session, and may include such information as a session name and purpose. The SIP INVITE message is forwarded from the P-CSCF 314 to the MGW 318 via the I/S-CSCF 316.

The MS 306, P-CSCF 314, I/S-CSCF 316, and MGW 318 conduct SDP negotiations via SIP messages in step 404. These negotiations may include SDP answer, SDP offer, SDP success, and SDP answer exchanges. The SDP negotiations include a reservation of circuit resources by the MGW 318, as indicated by step 406.

In step 408, the P-CSCF 314 utilizes a Policy Control Function (PCF) mechanism to authorize QoS resources requested during the SDP negotiations in step 404, which may occur multiple times during the SDP negotiations. In the present example, this a NULL operation because no QoS is being requested (i.e., conversational grade QoS is inherent in the circuit domain connection 320 and need not be requested). In step 410, the MGW 318 sets up first and second circuit legs to the MS 306 and the other party 308, respectively.

The MGW 318 receives a ringing indication in step 412 and maps the ringing indication to a SIP ringing response message, which is then sent to the MS 306 via the I/S-CSCF 316 and P-CSCF 314. When the MGW 318 receives an answer indication in step 414, it relays this information as a SIP OK message to the P-CSCF 314 via the I/S-CSCF 316 in step 416. The P-CSCF 314 utilizes the PCF to commit the requested QoS in step 418, which is a NULL operation because no QoS was requested. The P-CSCF 314 then forwards the SIP OK message to the MS 306 in step 420. The MS 306 may then begin using the media resources authorized and committed in the call set-up in step 422. In step 424, the MS 306 sends a SIP ACK message to the I/S-CSCF 316 via the P-CSCF 314.

Figure 7:
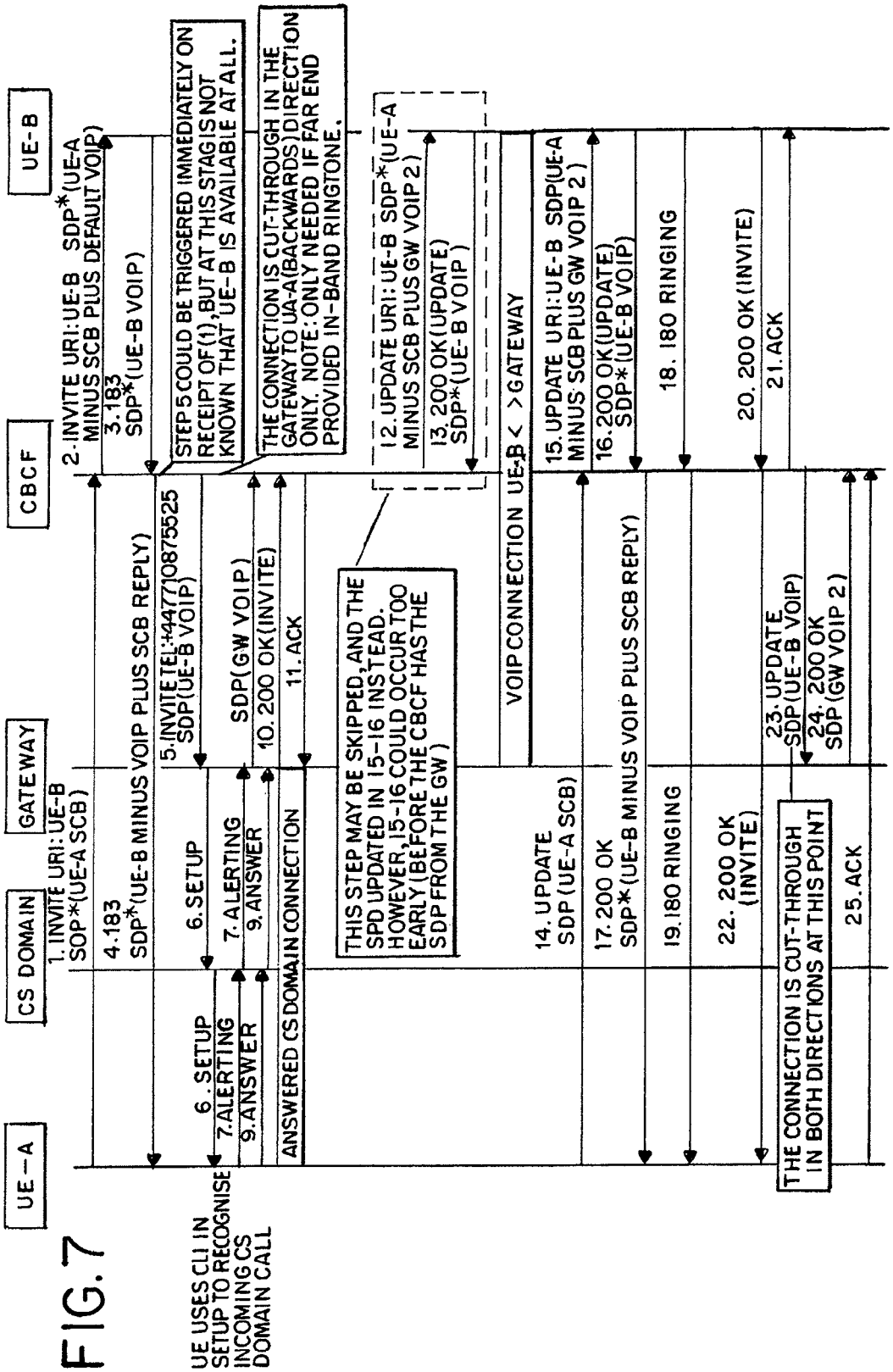

FIG. 7 shows a similar call flow in greater detail. The Circuit Bearer Control Function (CBCF) is network-based and the Circuit Bearer is initiated by a CBOF in the network. For clarity the CBOF and CBTF are not explicitly shown but the CBOF is collocated with the CBCF and the CBTF is at UE-A. The call flow begins at step 1 when UE-A sends a SIP INVITE message which is addressed to UE-B (the called party). UE-A knows that the access network is not optimised to support VoIP and so it includes SDP declaring that UE-A supports SIP Circuit Bearer. This SDP also indicates that UE-A supports the Circuit Bearer Terminating Function (i.e. that the UE is capable of receiving an incoming Circuit-switched connection for SCB) and the address to which the SCB call should routed (which will be a MSISDN allocated to UE-A). This number may be a special number allocated to the UE for SIP Circuit Bearer purposes or it may be the normal MSISDN of the terminal. This information can be indicated using suitable extensions to the Session Description Protocol, as described in the Appendix. Alternatively, the capabilities of UE-A may already be known to the network, based for example on the user identity. In this case, the network may automatically retrieve the relevant parameters from a database of subscription information, such as the HSS (FIG. 3).

The INVITE message is received by the CBCF, which recognises that UE-A supports SCB. The CBCF removes the SCB field from the SDP, adds the standard VoIP field, and then forwards the modified INVITE message to UE-B at step 2. UE-B replies, at step 3, with a message indicating that it supports VoIP. The CBCF then forwards a modified message to UE-A, at step 4, indicating that the network CBCF supports SCB. This message also includes the CLI of the CBOF that will be making the circuit bearer call.

The CBCF then instructs the CBOF to initiate the circuit bearer leg of the call. A SIP INVITE message is sent to the Gateway, at step 5, which includes the circuit bearer number of UE-A. The Gateway initiates, at step 6, a circuit call to UE-A. UE-A recognises the circuit bearer call and responds, preferably without ringing to alert the user. The terminal knows to associate this call with the existing SIP call as it has already been told the CLI of the CBOF that will be making an incoming call and is expecting the incoming call.

Having established a circuit bearer call between UE-A and the Gateway, the CBCF informs UE-B of the IP address of the Gateway in a SIP UPDATE message. A VoIP connection is established between the Gateway and UE-B. In parallel with the above steps, on receiving and answering the incoming Circuit call, UE-A sends an UPDATE message (Step 14) towards the CBCF. This message updates session description information indicating that the pre-conditions for the session have now been met. This is according to standard procedures in which sessions are established with "pre-conditions" which are then cleared when the resources necessary for the session have been established. The CBCF forwards the UPDATE towards UE-B, making appropriate modifications to the session description to replace the references to SCB with standard VoIP parameters. It should be noted that steps 14-17 could occur either before or after steps 12-13. In messages to UE-B then pre-conditions will only be marked as 'met' when both messages 10 and 14 have been received by the CBCF.

According to standard procedures, on receipt of an indication that pre-conditions have been met, UE-B can begin alerting the terminating user UE-B. UE-B returns a message (at step 18) to indicate that called party alerting has begun. This is passed to UE-A by the CBCF. When the called user answers the call, this is indicated by messages at steps 20 and 22. At step 23 the connection is cut-through in both directions, to establish an end-to-end connection which comprises the circuit domain connection between UE-A and the Gateway and the packet-domain connection between the Gateway and UE-B. It should be noted that UE-B is not aware that a SIP Circuit Bearer is in use between UE-A and the network.

Figure 8:
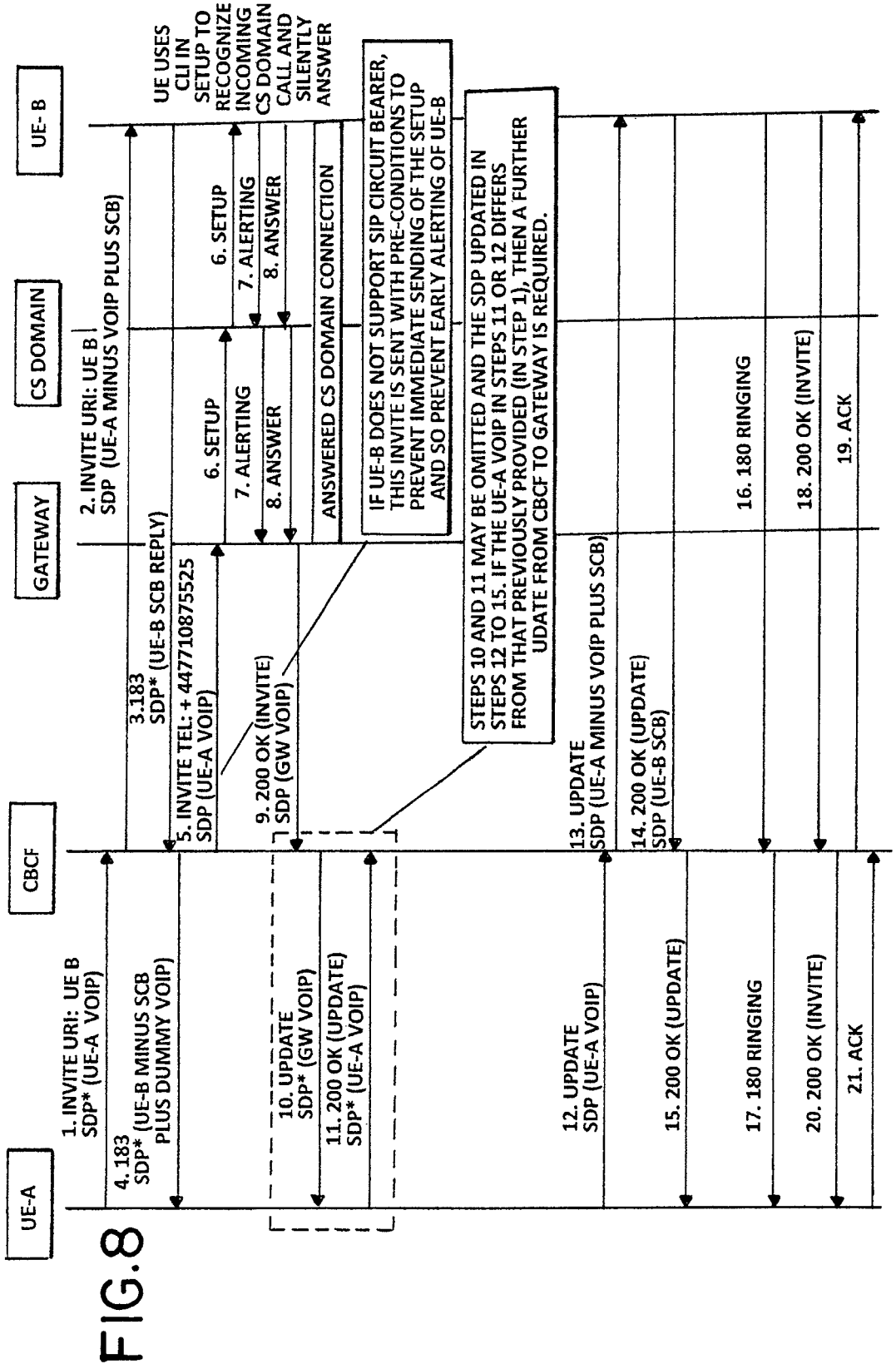
FIG. 8 shows a call flow of the terminating leg of a call where a circuit bearer is initiated by the network.

FIG. 8 shows a call flow for the situation where a SIP circuit bearer is established at the terminating leg of a call to terminal UE-B. Terminal UE-A initiates a call by sending a SIP INVITE message towards UE-B, indicating that a VoIP connection is required. The CBCF intercepts the message. Knowing that the network which will be used for the terminating leg of the call is not optimised for VoIP, the CBCF forwards the message at step 2, substituting an indication that SCB should be used. Note that, alternatively, the CBCF may add an indication that SCB is available, leaving it to UE-B to determine whether SCB or standard VoIP should be used. UE-B responds at step 3, indicating that it supports SCB. The CBCF instructs a Gateway to initiate a circuit call to UE-B at step 5. The circuit call is set up between the Gateway and UE-B at steps 6-8 in a similar manner to the previously described call flow.

At step 10, UE-A is made aware of the session description information from the Gateway. UE-A responds with its own session description according to standard procedures. Again, according to standard procedures, when pre-conditions at UE-A are met, UE-A will send an UPDATE to update the session description (Step 12). This is passed on to UE-B (Step 13), with appropriate modifications to replace the VoIP parameters with SCB parameters. UE-B responds (Step 14) and the response is forwarded to UE-A (Step 15), again with appropriate modifications to replace the SCB parameters with the VoIP parameters of the gateway.

Figure 9:
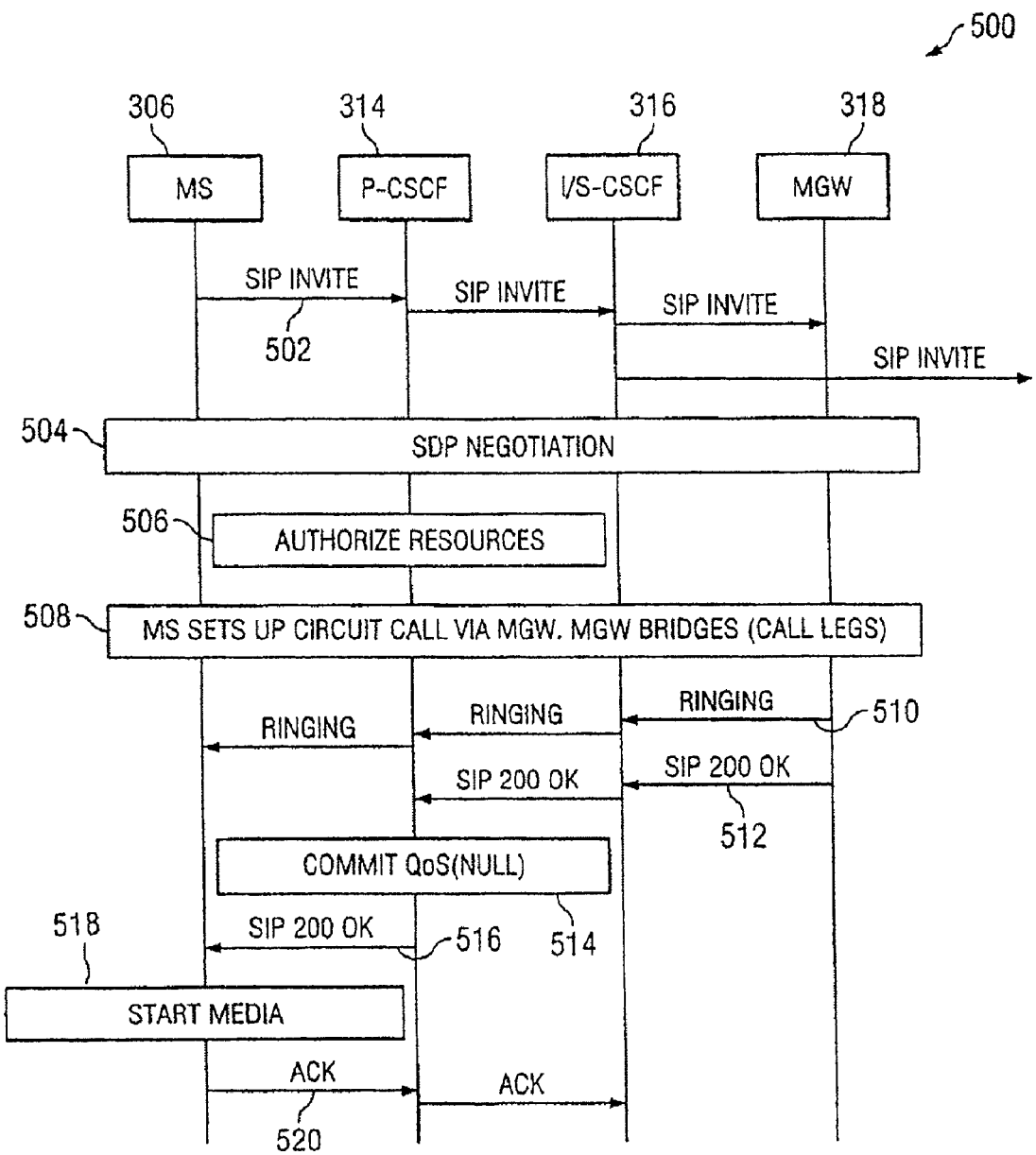
FIG. 9 shows a call flow of a call set-up in which a circuit bearer is requested by a mobile device within the architecture of FIG. 3.

Referring to FIG. 9, in another embodiment, the architecture 300 may be requested by the mobile device 306 (rather than by the network via the MGW 318), as described above. As stated previously, the architecture 300 may be used for a call session that provides IP based, real-time, conversational, multimedia services using 3GPP IMS prior to the introduction of IP QoS mechanisms in the network.

In operation, a signaling PDP context may be established between the MS 306 and the GGSN 310. SIP signaling then occurs between the MS 306 and the P-CSCF 314 to establish a call session. Network services may be executed using the S-CSCF 316. A first leg of the session may be established over either a packet or circuit connection, and may use a SIP VoIP or SIP circuit bearer call setup. The second leg of the connection (the circuit domain connection 320) is set up by the MS 306. During SIP/SDP signaling that occurs between the MS 306 and P-CSCF 314, which indicates that a circuit connection is to be established. The MS 306 recognizes this signalling and requests a circuit connection via the MGW 318. The MGW 318 then bridges both the first and second legs to connect the MS 306 and other party 308, and may remain in the session for mid-call service control.

Call flow 500 illustrates a sequence of messages that may be used within the architecture 300 of FIG. 3. In the call flow 500, the MS 306 is used to establish the circuit domain connection 320. The call flow 500 includes the MS 306, the P-CSCF 314, the I/S-CSCF 316, and the MGW 318. The call flow 500 relies heavily upon SIP messaging. The call flow 500 begins in step 502 when the MS 306 sends a SIP INVITE message to the P-CSCF 314. As described previously, the INVITE message includes an initial SDP packet in the SIP INVITE message body. The SIP INVITE message 302 is forwarded from the P-CSCF 314 to the MGW 318 via the I/S-CSCF 316, and may also be forwarded to another network entity, such as a terminator CSCF.

The MS 306, P-CSCF 314, I/S-CSCF 316, and MGW 318 conduct SDP negotiations via SIP messages in step 504. These negotiations may include SDP answer, SDP offer, SDP success, and SDP answer exchanges. In the present example, one of the SDP packets may include a codec value to indicate that a circuit bearer is being used. In step 506, the P-CSCF 314 utilizes a PCF mechanism to authorize QoS resources requested during the SDP negotiations 304, which may occur multiple times during the SDP negotiations. In the present example, this a NULL operation because no QoS is being requested (i.e., conversational grade QoS is inherent in the circuit domain connection 320 and need not be requested). In step 508, the MGW 318 sets up a first call leg with the other party 308, and the MS 306 sets up a circuit call (a second call leg) to the MGW 318 via the circuit domain connection 320. The MGW 318 then bridges the first and second call legs.

In step 510, the MGW 318 sends a ringing indication to the MS 306 via the I/S-CSCF 316 and P-CSCF 314. When the MGW 318 receives an answer indication in step 512, it relays this information as a SIP OK message to the P-CSCF 314 via the I/S-CSCF 316. The P-CSCF 314 utilizes the PCF to commit the requested QoS in step 514, which is a NULL operation because no QoS was requested. The P-CSCF 314 then forwards the SIP OK message to the MS 306 in step 516. The MS 306 may then use the media resources authorized and committed in the call set-up in step 518. In step 520, the MS 306 sends a SIP ACK message to the I/S-CSCF 316 via the P-CSCF 314.

Figure 10:
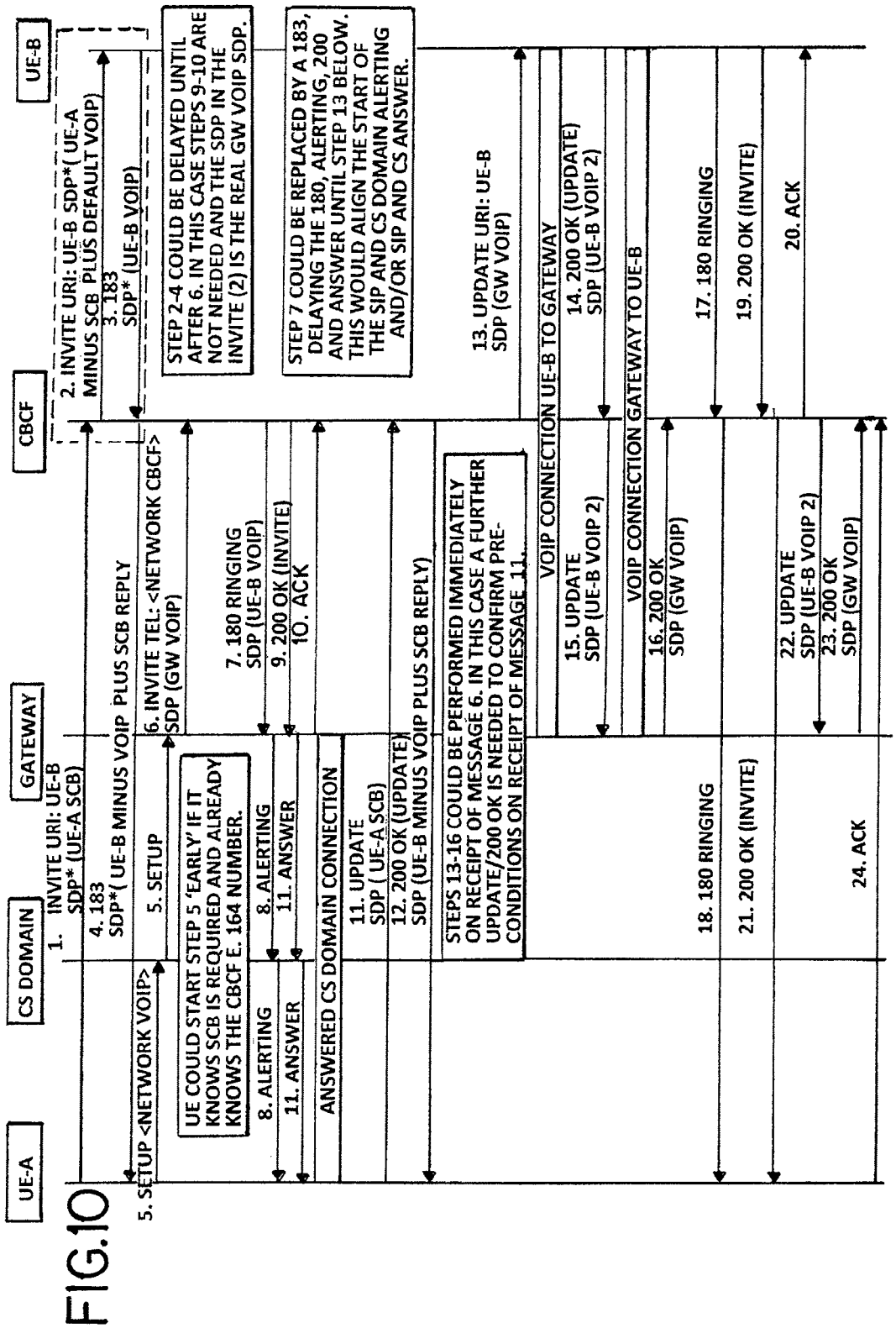
FIG. 10 shows a call flow in which a mobile device establishes an outgoing circuit bearer.

FIG. 10 shows a further embodiment in which the CBCF function is network-based and the Circuit Bearer is initiated by a CBOF in the terminal (UE-A). For clarity the CBOF and CBTF are not explicitly shown but the CBOF is collocated with UE-A and the CBTF is at the CBCF. Steps 1-4 are the same as those in FIGS. 7 and 8. At step 5 UE-A sets up a circuit call by contacting the Gateway, using the E.164 number it has been provided with in the session description at Step 4. Alternatively, if UE-A knows the E.164 number needed for setting up the circuit bearer connection, then it can begin step 5 earlier than shown. At step 13 the CBCF informs UE-B of the IP address of the Gateway in a SIP UPDATE message. A VoIP connection is established between the Gateway and UE-B. The remaining steps are similar to those already described at FIG. 7.

Figure 11:
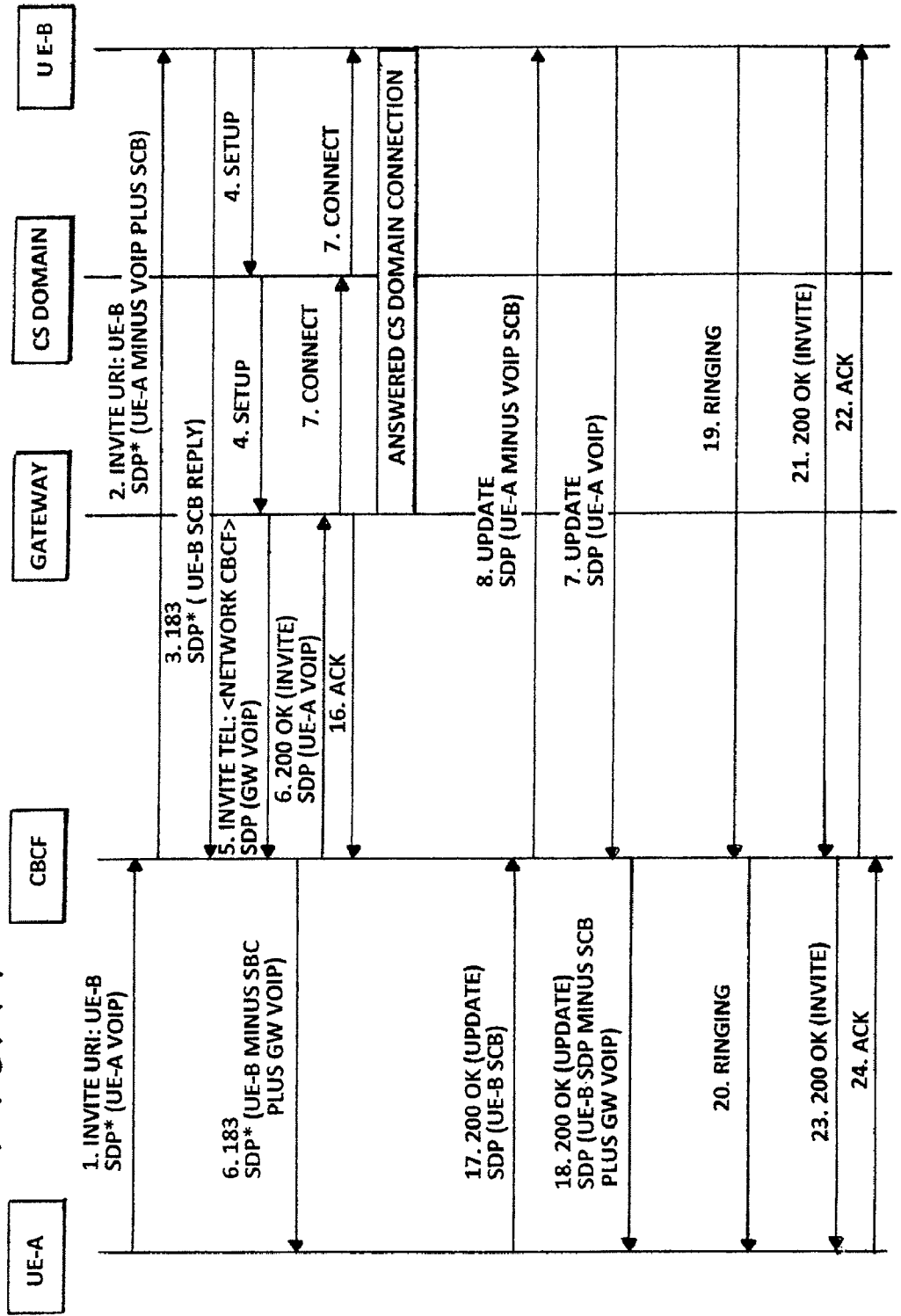
FIG. 11 shows a call flow for a terminating leg of a call in which a terminal establishes an outgoing circuit bearer.

FIG. 11 shows a call flow for the situation where a SIP circuit bearer is established at the terminating leg of a call to terminal UE-B. The CBCF knows that the access network which will be used to support the terminating leg of the call is not optimised for VoIP. The CBCF sends an initial SIP INVITE message (at step 2) specifying that SCB is to be used. Alternatively, the CBCF may indicate that either SCB or VoIP may be used, leaving the decision to UE-B. Terminal UE-B responds, indicating that it supports SCB, and then initiates a CB call at step 4 to the Gateway. The remaining steps are similar to those described previously with reference to FIG. 8.

Figure 12:
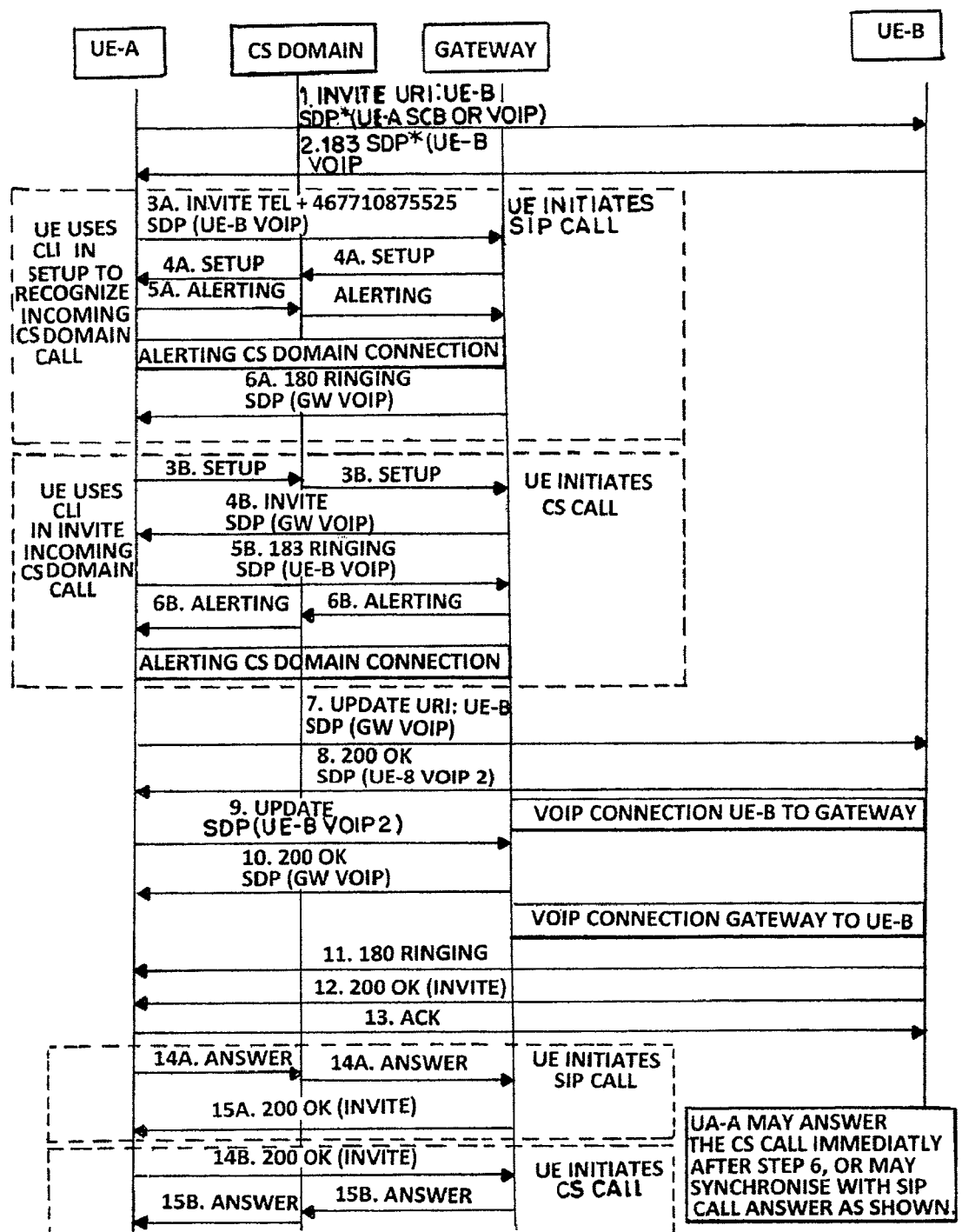
FIG. 12 shows a call flow for a call set-up in which call control is performed by the mobile device.

In the above call flows the Circuit Bearer Control Function (CBCF) is network-based. In contrast, in the two following examples the CBCF forms part of the terminal. For clarity the CBCF is not shown as a separate entity, but is collocated with the terminal UE-A. An entirely terminal-based solution has the advantage that a network operator does not need to upgrade their network equipment to support the SCB service. In FIG. 12 the call flow begins at step 1 by terminal UE-A sending a SIP INVITE message to terminal UE-B. SDP in the message indicates that UE-A can support SIP Circuit Bearer or VoIP. UE-B responds at step 2 indicating that it supports a VoIP connection.

UE-A now begins a sequence of steps to establish a circuit call with a Gateway and to inform UE-B of the Gateway's identity. Two alternative ways of setting up a circuit call are shown as steps 3a-6a and steps 3b-6b. Taking the first method, UE-A sends, at step 3a, a SIP INVITE message to the Gateway. This message includes the UE-A's own circuit number and effectively requests a circuit call with itself. The 'SDP (UE-B VoIP)' are the VoIP parameters of UE-B that were provided in step 2—i.e. the IP address and port to which the gateway should send VoIP packets towards UE-B. The Gateway initiates a circuit call with UE-A at step 4a. UE-A recognises the CLI and answers the call. The routing of the INVITE message is automatic, i.e. terminal UE-A does not need to know the IP address of the gateway. At step 6a the terminal receives the SDP of the gateway.

The alternative method of establishing a circuit call with the Gateway is shown at steps 3b-6b. Firstly, at step 3b, UE-A initiates a CB call with itself via the Gateway. The UE initiates this by sending a CS domain SETUP message addressed to an MSISDN which has been allocated to the UE for incoming IMS calls. According to standard call routing and procedures, the gateway interworks this to a SIP INVITE addressed to the UE (Step 4b). This message includes the VoIP parameters of the gateway within the session description. At Step 5b, the UE responds to this INVITE with a SIP 180 Ringing indication into which it places the VoIP parameters it has received from UE-B. At Step 6b, the gateway interworks this to a CS domain alerting indication, whilst also noting the VoIP parameters it has been provided with.

Having established a CB call between UE-A and the Gateway, the CBCF of UE-A, at step 7, informs UE-B of the VoIP parameters of the Gateway using a SIP UPDATE message. This ensures that UE-B establishes a VoIP connection with the Gateway rather than UE-A. The CBCF of UE-A has now established the two legs of the path between itself and UE-B: a first (circuit bearer) leg between UE-A and the Gateway and a second (IP bearer) leg between the Gateway and UE-B. SIP messaging continues to occur directly between UE-A and UE-B.

Figure 13:
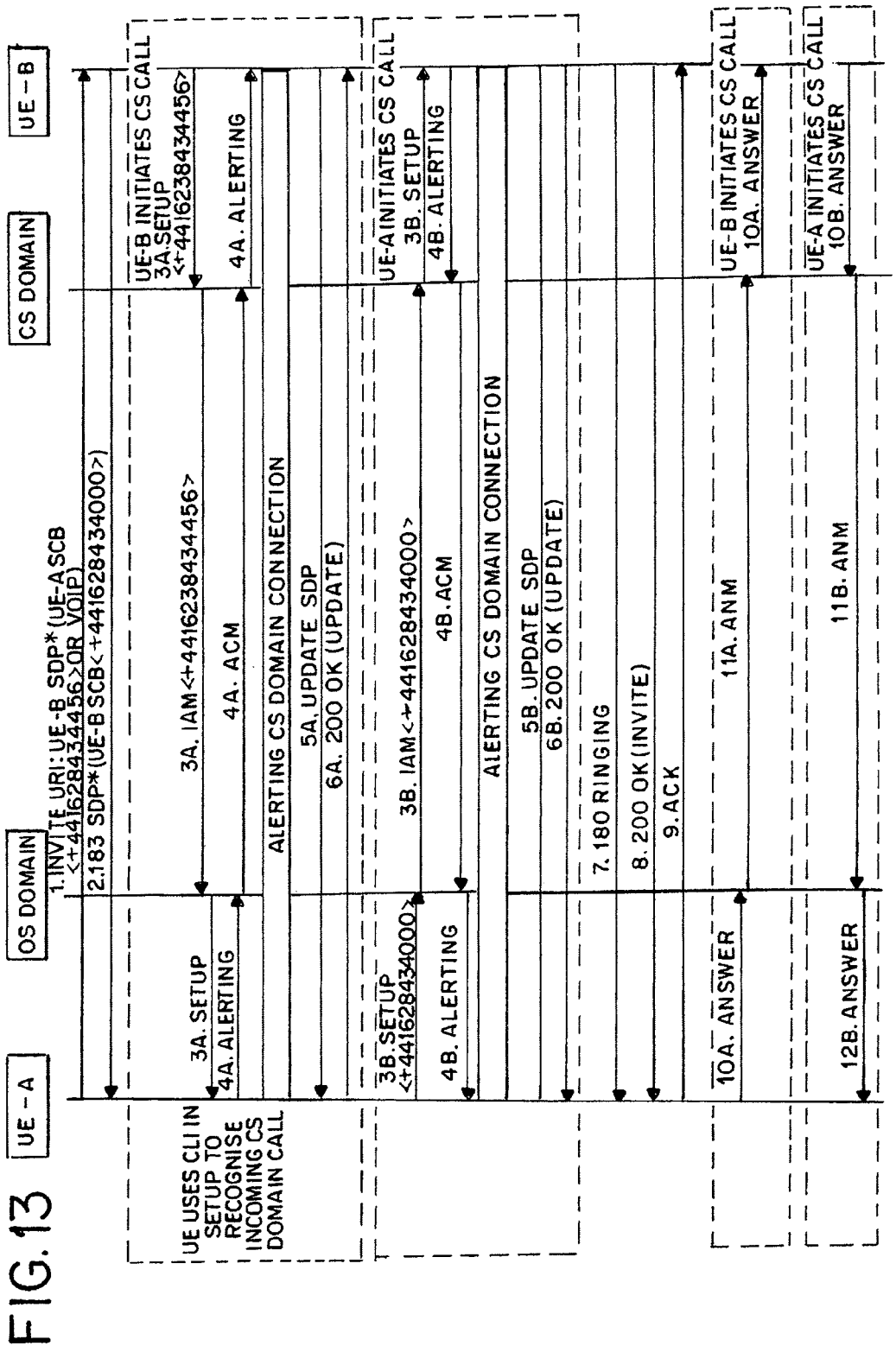
FIG. 13 shows a call flow for a call set-up in which call control is performed by the mobile device, and devices at both ends of the connection can support a circuit bearer.

In the call flow of FIG. 13 UE-A sends a SIP INVITE message to UE-B, including SDP which indicates that it is capable of supporting SCB or VoIP. UE-B receives the message, indicates that it too supports SCB and initiates a circuit switched call at steps 3a-6a. Alternatively, UE-A can initiate the circuit-switched call at steps 3b-6b. In this case there is no IP bearer or Gateway involved in the call.

In a final alternative, UE-A and UE-B have a pre-existing CS domain connection between them (i.e. they are engaging in a normal CS domain voice call). UE-A wishes to convert this call into an IMS session with SIP Circuit Bearer. This may be achieved by following the call flow of FIG. 13. UE-A indicates within the session description in Step 1 that it is prepared to initiate a SIP Circuit Bearer Call, and the CLI that it will use. On receiving this message, UE-B detects that it already has a call in progress from a matching CLI, which must be UE-A. UE-B can respond in Step 2, indicating that it accepts incoming SIP Circuit Bearer calls and providing it's destination number. UE-A can similarly detect that a call is already ongoing to that number, and proceeds to associate this call with the IMS Session, in preference to establishing a new circuit call.

The above scenarios have assumed that the terminal is aware that a SIP Circuit Bearer is required. If the terminal is unable to determine this by itself, then the terminal will offer both SCB and VoIP SDP as described above. If the network is aware that SCB is required (cases 1 and 2 above), then this will be provided (and the terminal will receive an SDP answer indicating parameters of the SCB). If the network is aware that SCB is not required (i.e. native VoIP is supported by the network), then the network may reject the SCB indication in the SDP using the mechanisms for applying policy to SDP requests. The terminal will retry with a normal VoIP session.

In order to deploy terminals which do not automatically detect the access type, the network operator must deploy network equipment which can handle the SCB decision. The inability of the local network to support VoIP can be indicated to the terminal simply by refusing a VoIP resource reservation. A final possibility is the case in which the network recognises that SCB is required, but does not itself provide the CBCF. Further SDP extensions may be required to allow the network to indicate this case to the UE, or the UE could automatically detect this case when it's VoIP resource reservation fails.

Figure 14:
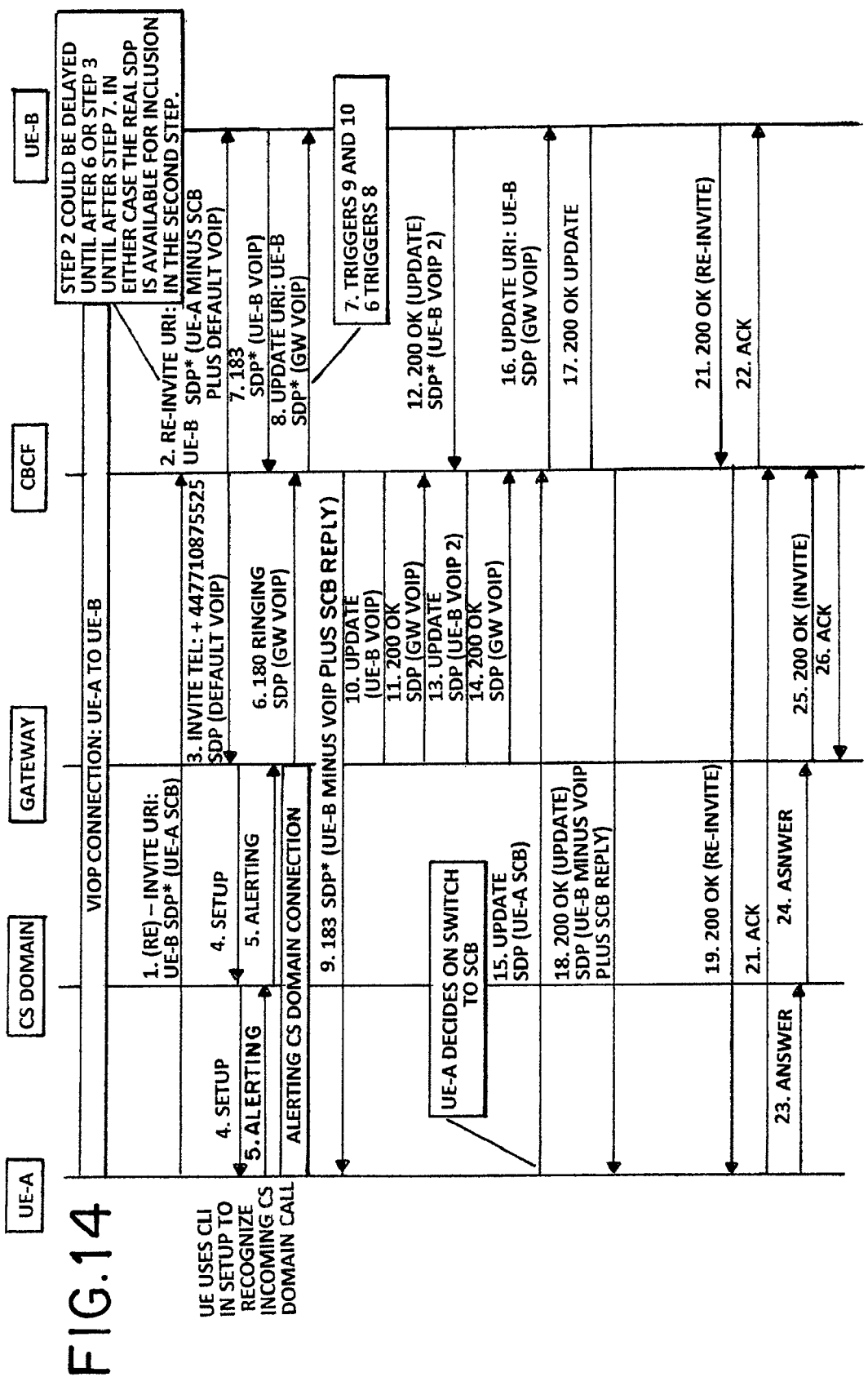
FIGS. 14-17 show call flows where a circuit bearer is established during an existing call session.

In each of the above call flows the SIP Circuit Bearer (SCB) is established at the start of a call. However, the method is not limited to use at the beginning of a call but can be applied to an ongoing VoIP session to transfer part of the IP bearer path to a SIP Circuit Bearer. FIG. 14 shows a call flow which begins with an existing VoIP session between terminals UE-A and UE-B. The network includes a CBCF and UE-A supports incoming CB calls. At step 1 UE-A sends a SIP INVITE message to UE-B, indicating that it supports SCB. Step 1 can be triggered by a need for UE-A to transfer to an access network which is not optimised for carrying VoIP calls. At steps 3-6 the CBCF initiates a CB call between the Gateway and UE-A. At step 8 the CBCF updates UE-B with the IP address and capabilities of the Gateway. This will establish the necessary parameters at UE-B to allow it to subsequently send IP packets to the Gateway rather than UE-A. At Step 7, UE-B responds to the re-invite request, indicating its own VoIP parameters (and possibly responses to other elements in the SDP). The VoIP parameters are provided to the gateway in Step 10 and other parameters to UE-A in Step 9.

At Step 12, UE-B responds to the gateway's VoIP parameters that were provided in Step 8. This message may include changes to UE-B's VoIP parameters, which then need to be communicated to the gateway in Step 13. It should be noted that, up to this point, the session descriptions exchanges between UE-A, the CBCF and UE-B have indicated outstanding pre-conditions. Therefore, according to standard SIP procedures, these exchanges will not yet cause any change in the media flows for the session. However, they will establish all the necessary parameters at the correct nodes to enable a rapid switch from the previous media connection to the new one.

At Step 15, UE-A determines that it needs to switch to the SIP Circuit Bearer connection. This could occur, for example, because UE-A's previous VoIP-optimised IP connection is disconnected. UE-A sends an UPDATE containing its session description, modified to indicate that pre-conditions are now met. At Step 16, UE-B responds, indicating similarly that the preconditions are now met. Since this is an automatic update of a session in progress, there is no need to wait for the user to answer the session at UE-B and the 200 OK to the original Re-INVITE can be sent immediately (Step 19).

Figure 15:
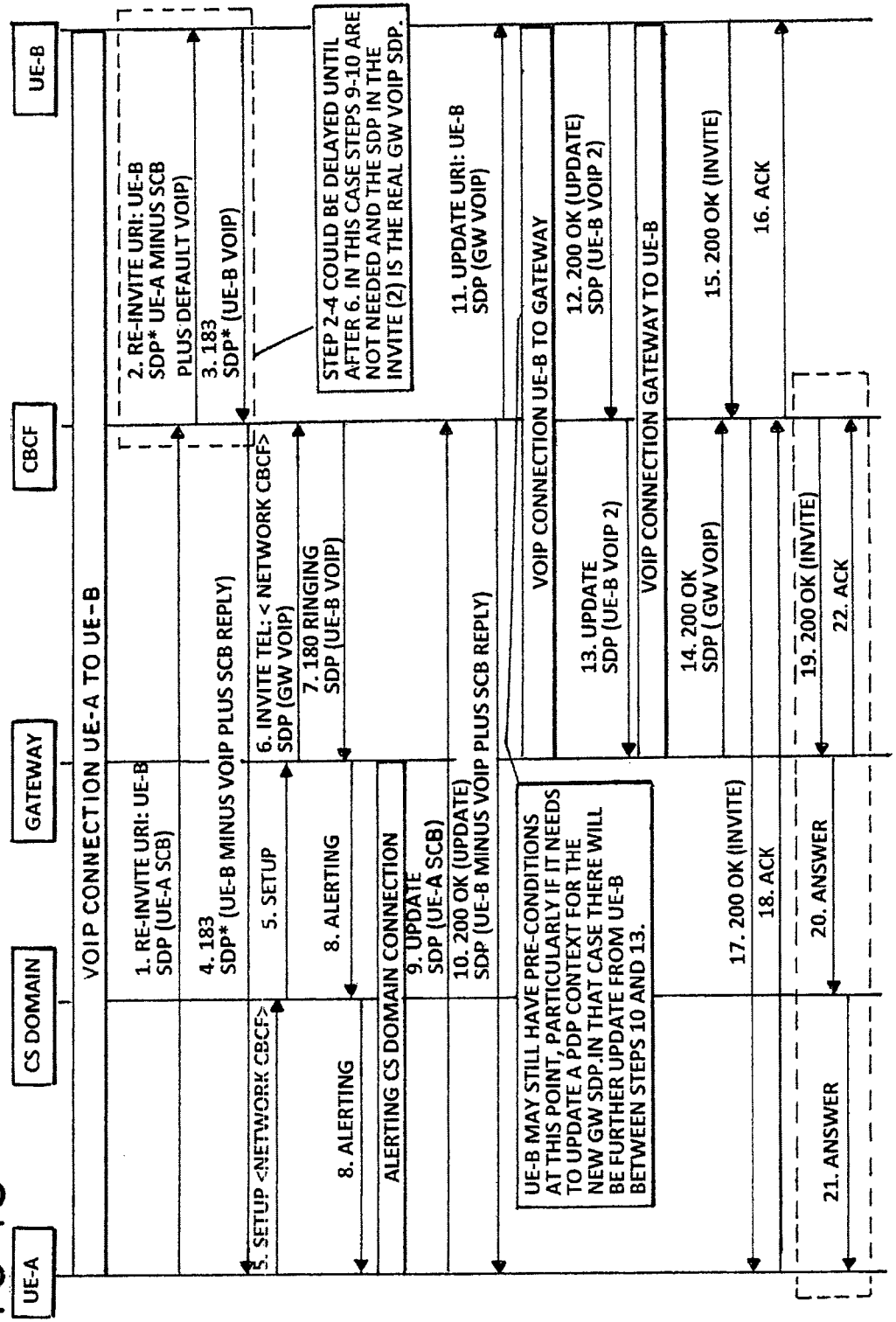
Figure 16:
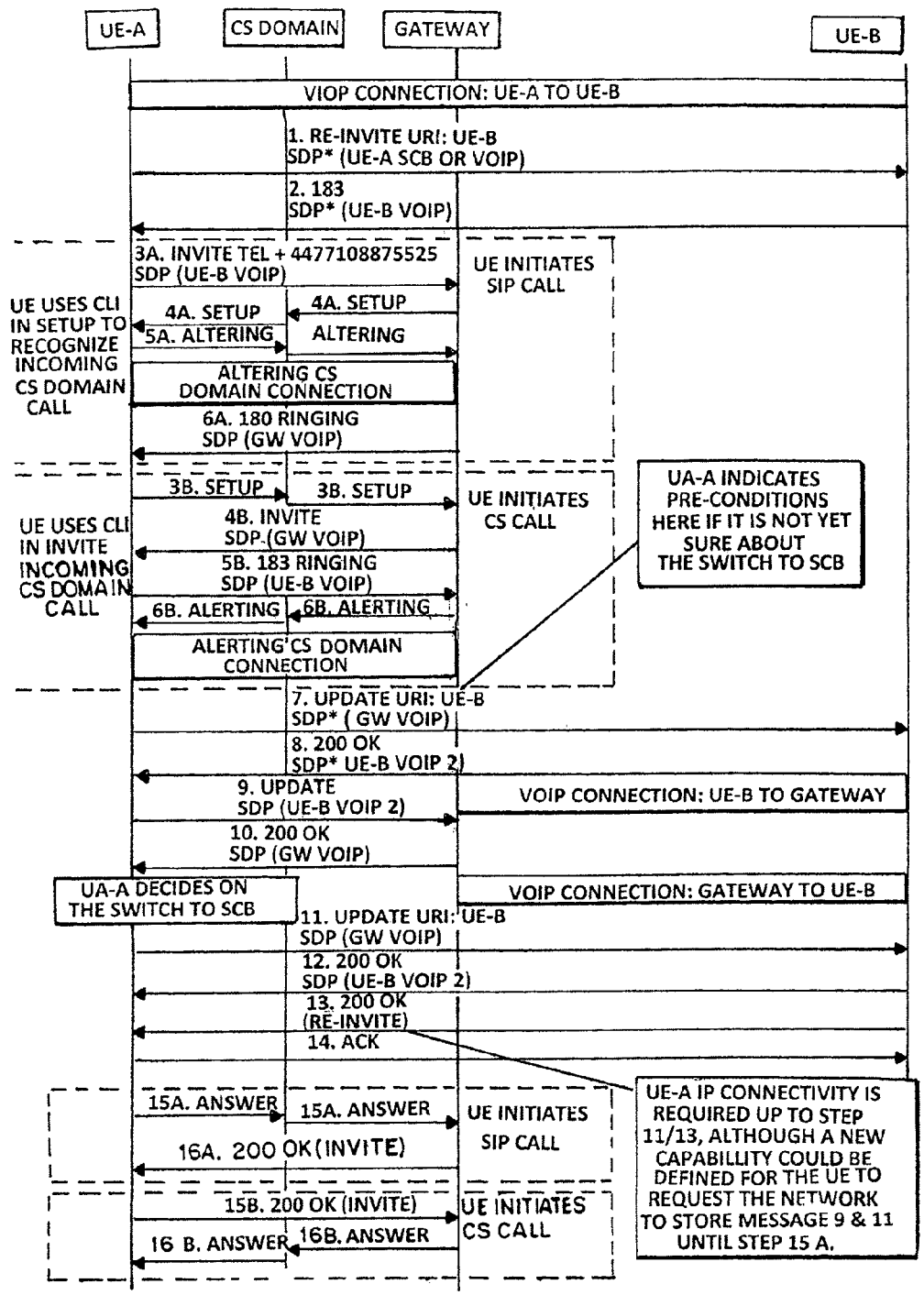
Figure 17:
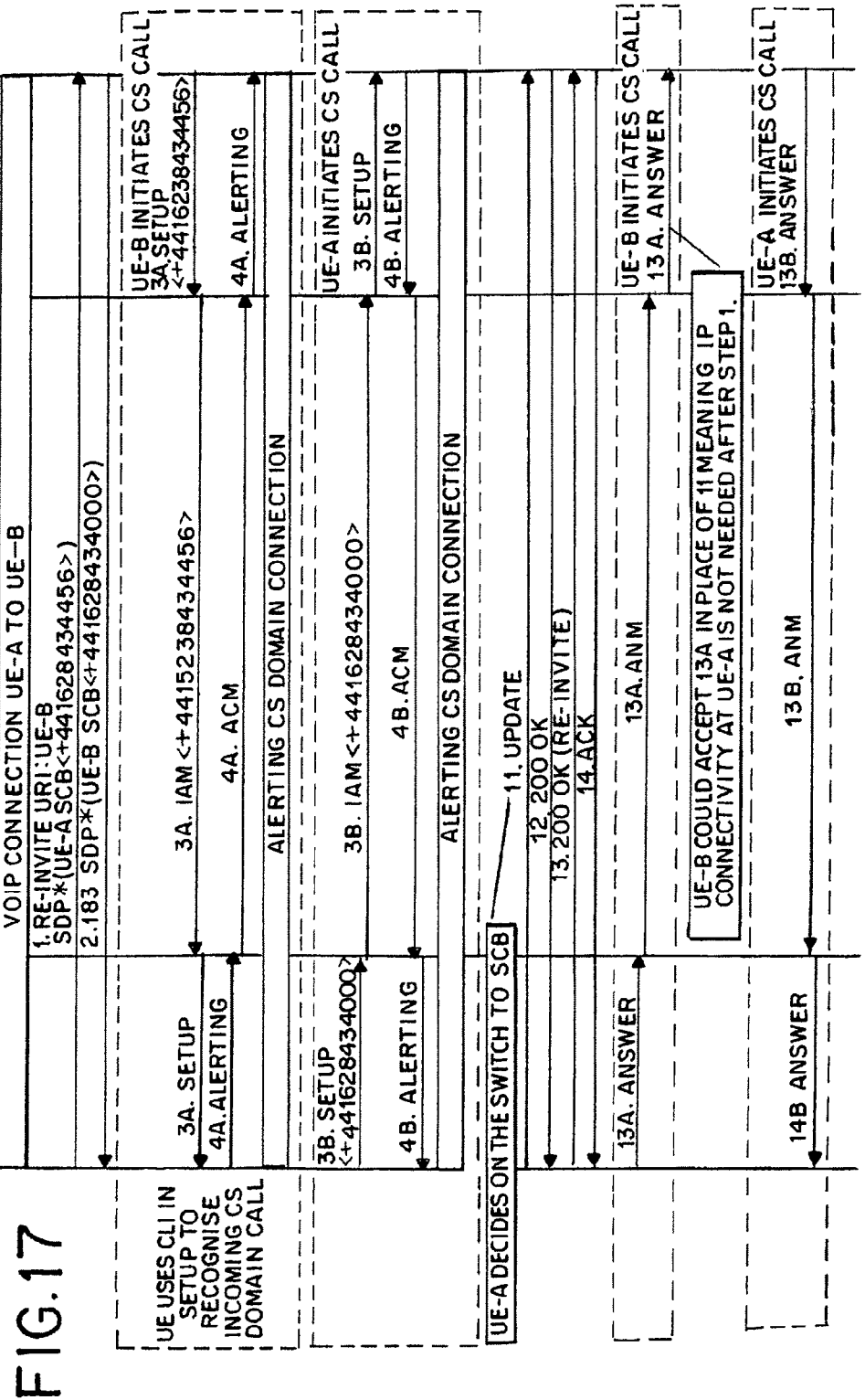

FIG. 15 shows another call flow in which part of an existing VoIP path is transferred to a SCB. In this call flow the CBCF is network-based and the SCB is established by the terminal UE-A. FIG. 16 shows another call flow in which part of an existing VoIP path is transferred to a SCB. In this call flow the call control functions (CBCF) are resident in terminal UE-A and operation is similar to that previously described in FIG. 12. In this call flow, steps 19-22 could be completed as early as step 7. Note that in this case, no further SIP signalling is needed to complete the switch to SCB. This means the switch could be completed even if IP connectivity is lost after step 1 (so long as the CBCF is tolerant to the loss of messages 4 and 19.) However there is no possibility to establish the CB before it is needed. FIG. 17 shows a further call flow in which part of an existing VoIP path is transferred to a SCB. This call flow is similar to FIG. 12 in that the VoIP connection is replaced entirely by a CS connection. The call flows for VoIP to SCB switching work best if there is IP connectivity at UE-A throughout the process.

In general, the following cases support loss of the IP connectivity after the first SIP message initiating the switch is sent:

Case 1: Network-based CBCF with network-initiated CS calls

Case 2: Network-based CBCF with user-initiated CS calls

Note: in case 1 is it possible for the UE to establish the CS bearer first and then confirm the switch with a CS ANSWER message. This is not possible in case 2—the switch is triggered by the initial CS SETUP.

Case 4: Both UE's support SCB, no CBCF at all

Again, if the far end (UE-B) initiates the CS call, then UE-A can confirm the switch with a CS ANSWER message. If UE-A initiates the CS call, then the switch is triggered by just the SETUP.

To support this mode with Case 3 (Client based CBCF), a new network service is be required. This new service automatically generates the UPDATE to UE-B on UE-A's behalf as a result of the ANSWER indication received at the gateway. This new network service is based on a SIP proxy in the network being made aware of the linkage between UE-A's session with UE-B and UE-A's session with the gateway. The proxy can then determine that the answer of the session with the gateway is the pre-condition that the session with UE-B is waiting for. This may be achieved by UE-A sending the UPDATE 'early' with an instruction to the proxy to store it until some other condition is met, before processing.

Figure 18:
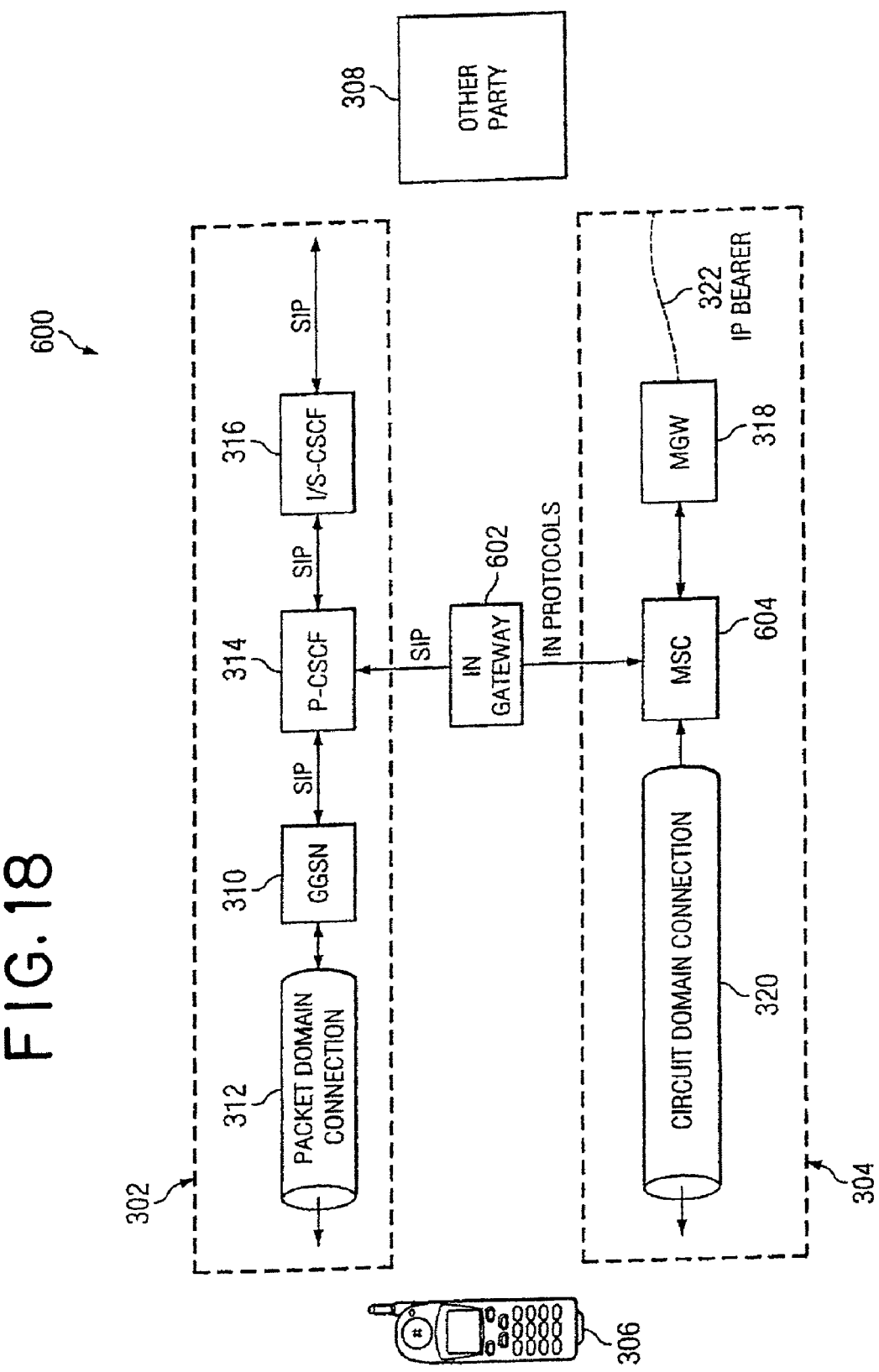
FIG. 18 shows another embodiment of an architecture that may be used to implement the method of FIG. 1 within the system of FIG. 2.

The invention can be applied to other network layouts. FIG. 18 shows an architecture 600 which illustrates another possible implementation of a call session. A communication session within the architecture 600 may be requested by the network via an intelligent gateway (rather than by the MS 306 or by the network via the MGW 318, as described above). The architecture 600 may be used to provide IP based, real-time, conversational, multimedia services using 3GPP IMS prior to the introduction of IP QoS mechanisms in the network.

The architecture 600 is similar to the architecture 300 of FIG. 3, but includes an intelligent network gateway (IN gateway) 602 and a MSC 604. The IN gateway 602 is positioned between the P-CSCF 314 and the MSC 604. The MSC 604 is positioned between the circuit domain connection 320 and the MGW 318. It is understood that the positions of the IN gateway 602 and the MSC 604 are for purposes of illustration, and that they may be positioned elsewhere within the architecture 600. Furthermore, the IN gateway 602 may be represented by a gateway function located on another network entity, such as the MSC 604, and so the IN gateway 602 may not be an independent physical network entity. The IN gateway 602 provides functionality for mapping between IP/SIP messages and SS7/IN messages.

Figure 19:
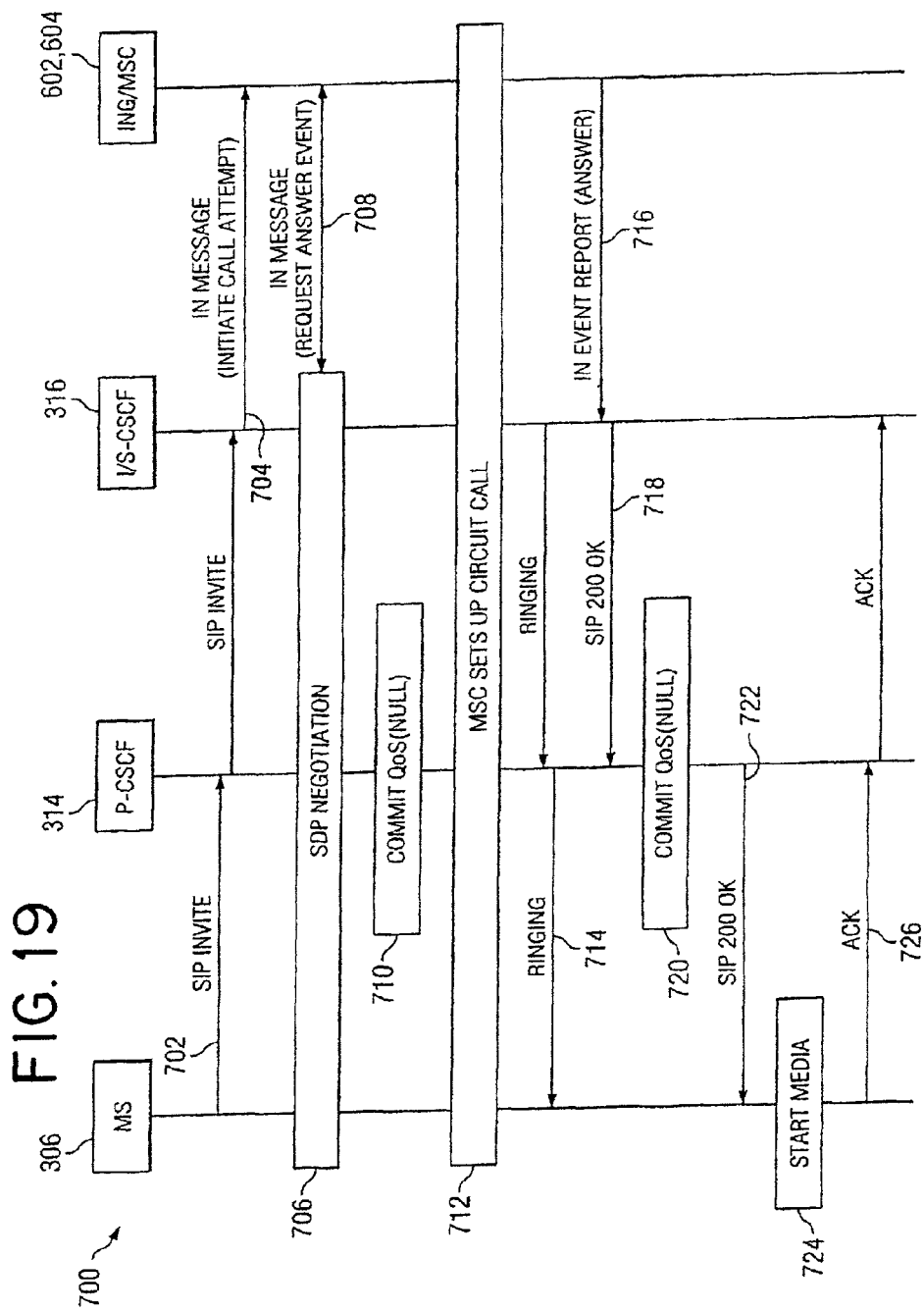
FIG. 19 shows a call flow of a call set-up in which a circuit bearer is requested by a network via an intelligent gateway within the architecture of FIG. 18.

In operation, as will described in greater detail in FIG. 19, a signaling PDP context may be established between the MS 306 and the P-CSCF 314 (via the GGSN 310). SIP signaling then occurs between the MS 306 and the P-CSCF 314 to establish a call session. Network services may be executed using the S-CSCF 316. A first leg of the session may be established using either a packet or circuit connection via an IN protocol message to the MSC 604. In the present example, the first leg is established using a standard SIP VoIP or SIP circuit bearer call setup.

The second leg of the connection is requested by the MS 306 via an IN message to the MSC 604. The first and second legs are then bridged to connect the MS 306 and other party 308. If both legs are circuit based, the bridging may be done by the MSC 604 without the need for the MGW 318. However, if the first leg is packet based, then the MGW 318 may be needed to complete the bridging in conjunction with the MSC 604.

With additional reference to FIG. 19, a call flow 700 illustrates a sequence of messages that may be used to establish the communication session described previously, in which the network requests the circuit domain connection 320 via the IN gateway 602. The call flow 700 includes the MS 306, the P-CSCF 314, the I/S-CSCF 316, and the IN gateway 602 and MSC 604 (which are combined in this illustration and denoted by the reference number 604).

The call flow 700 begins in step 702 when the MS 306 sends a SIP INVITE message to the P-CSCF 314. As described previously, the INVITE message includes an initial SDP packet in the SIP INVITE message body. The SIP INVITE message is forwarded to the I/S-CSCF 316, which sends a corresponding IN message to the MSC 604 (via the IN gateway 602) to request a circuit connection in step 704.

In step 706, the MS 306, P-CSCF 314, and I/S-CSCF 316 conduct SDP negotiations via SIP messages. These negotiations may include SDP answer, SDP offer, SDP success, and SDP answer exchanges. In the present example, one of the SDP packets may include a codec value to indicate that a circuit bearer is being used. In step 708, which may occur simultaneously with step 706, interaction occurs with the IN gateway/MSC 604 to request answer notifications. In step 710, the P-CSCF 314 utilizes a PCF mechanism to authorize QoS resources requested during the SDP negotiations, which may occur multiple times during the SDP negotiations. In the present example, this is a NULL operation because no QoS is being requested (i.e., conversational grade QoS is inherent in the circuit domain connection 320 and need not be requested). In step 712, the MSC 604 sets up first call leg (which is circuit based in the present example) with the other party 308, and sets up a second call leg with the MS 306 via the circuit domain connection 320.

In step 714, the I/S-CSCF 316 sends a ringing indication to the MS 306 via the P-CSCF 314. When the MSC 604 receives an answer, it reports this to the I/S-CSCF 316 in step 716. In step 718, the US-CSCF 316 relays this information as a SIP OK message to the P-CSCF 314. The P-CSCF 314 utilizes the PCF to commit the requested QoS in step 720, which is a NULL operation because no QoS was requested. The P-CSCF 314 then forwards the SIP OK message to the MS 306 in step 722. The MS 306 may then use the media resources authorized and committed in the call set-up in step 724. In step 726, the MS 306 sends a SIP ACK message to the I/S-CSCF 316 via the P-CSCF 314.

Figure 20:
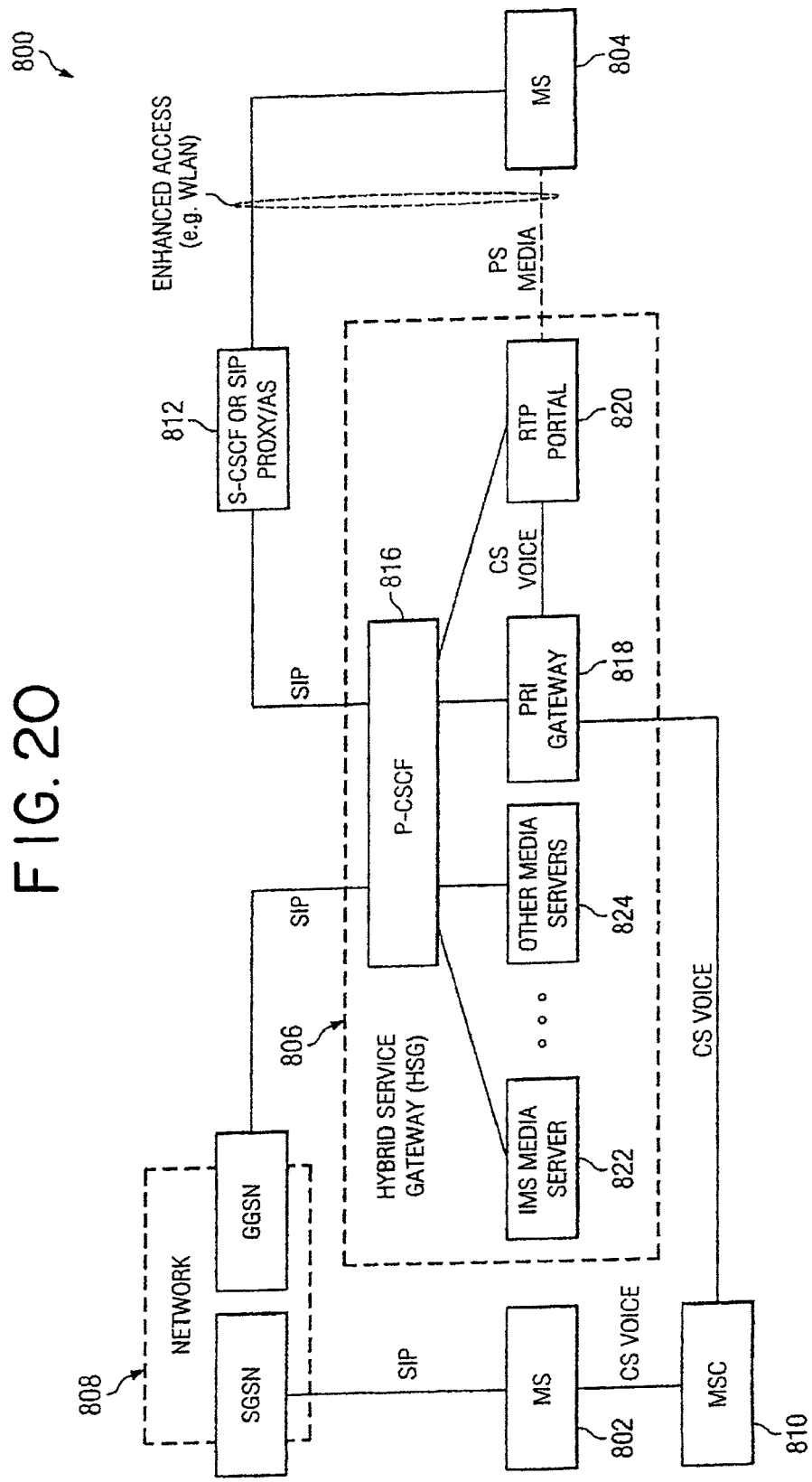
FIG. 20 shows yet another embodiment of an architecture that may be used to implement the method of FIG. 1 within the system of FIG. 2.

Referring now to FIG. 20, in another embodiment, an architecture 800 illustrates yet another possible architecture within which a call session representing the method 100 of FIG. 1 may be executed. As with previous examples, the architecture 800 may be used to provide IP based, real-time, conversational, multimedia services. For example, the services may be provided using IMS prior to the introduction of IP QoS mechanisms generally needed for the provision of such services. Connections within the architecture 800 may be circuit switched (CS) or packet switched (PS).

The architecture 800 includes an MS 802 and an MS 804. Disposed between the two mobile stations is a hybrid service gateway (HSG) 806. A network 808 (which may include network entities such as an SGSN, a GGSN, and/or other entities as described in FIG. 2) and an MSC 810 are positioned between the MS 802 and the HSG 806. An S-CSCF or SIP proxy/AS 812 is positioned between the MS 804 and the HSG 806, although not all connections between the MS 804 and the HSG 806 may go through the SIP AS 812.

The HSG 806 includes a plurality of different functions, which may be represented as actual independent physical components or may be represented merely as a functional module of the HSG 806. For purposes of clarity, these functions will be referred to as independent components that are combined within the HSG 806. In the present example, the HSG 806 acts as a P-CSCF 816 (e.g., it provides no services and controls the media in the local network). The HSG 806 also encompasses a SIP Primary Rate Interface (PRI) gateway 818, a Real-Time Protocol (RTP) portal 820, an IMS media server 822, and various other media servers 824.

The PRI gateway 818 may provide access to and from a network (such as an IP network) by acting as a signaling and media gateway between a VoIP network and a circuit based network, using the ISDN Primary Rate Interface. To provide access, the PRI gateway 818 generally converts packet-based voice streams to circuit-based voice streams and vice versa. The RTP portal 820 may enable elements in a private SIP network to securely communicate with elements in a public network in both directions. The RTP portal 820 may also serve as an anchor point for the RTP media stream. This provides additional flexibility by, for example, enabling the architecture 800 to work with voice broadcast types of services.

In operation, as will be described in greater detail with reference to FIGS. 21 and 22, services may be provided at the S-CSCF (or the SIP proxy/AS) 812. Because of this, the MS 804 may be unaware that a circuit switched leg is being used (e.g., SIP services, such as call forwarding and web based provisioning, are entirely re-used from IMS). Furthermore, the PRI gateway 818 may not "call" the MS 804. Instead, SIP signaling may be used to provide the MS 804 with a port number at the RTP portal 820, which provides a "true" VoIP SIP session set up. In addition, while the architecture 800 may enable both legs to be circuit switched, it may be desirable to add an additional PRI gateway. Access methods may be mixed by registering with a different P-CSCF (e.g., using R6 VoIP method, WLAN, LAN, etc.).

Figure 21:
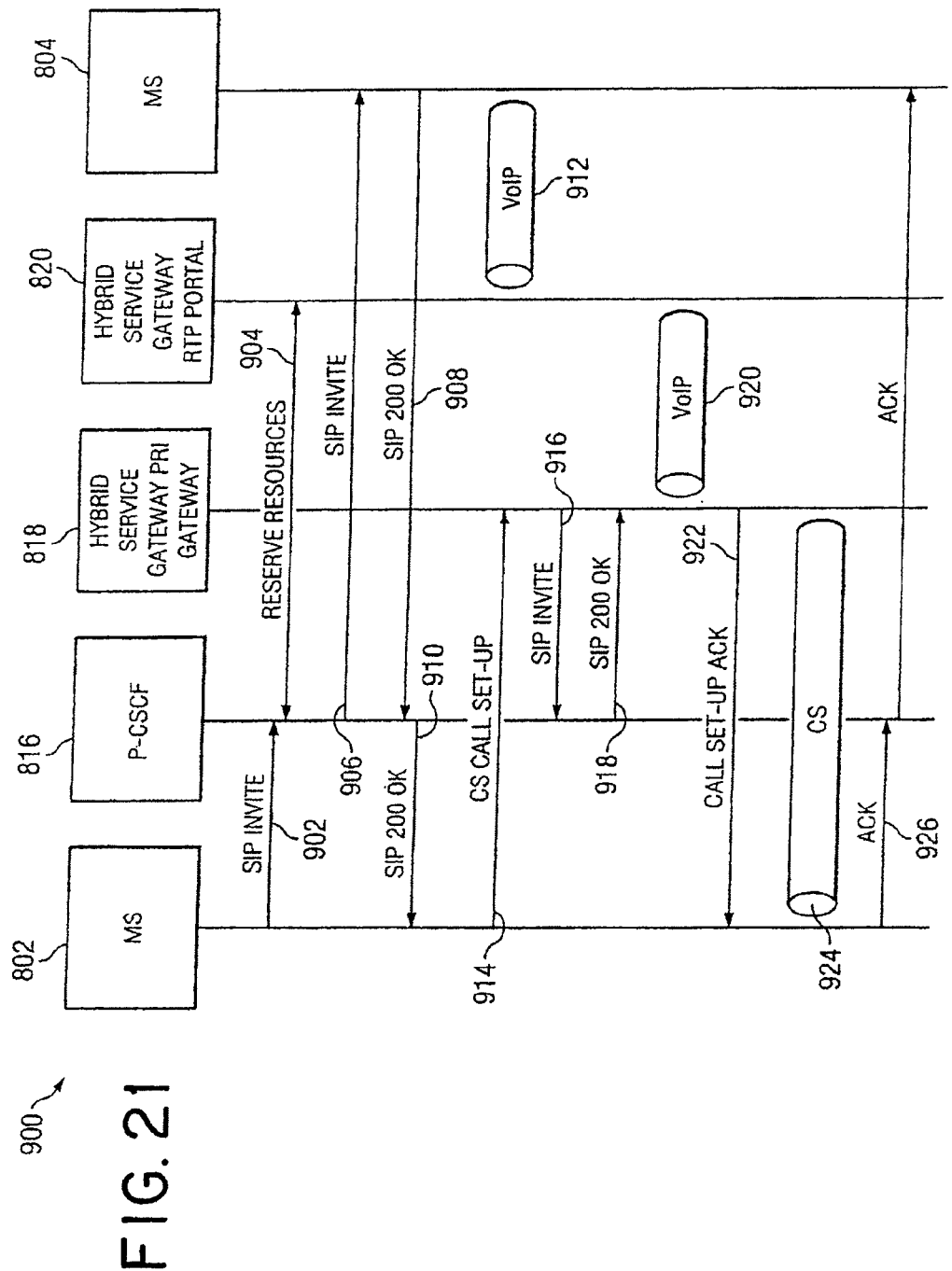
FIG. 21 shows a call flow of a call set-up in which a mobile device initiates a call to a network within the architecture of FIG. 20.

With additional reference to FIG. 21, a call flow 900 illustrates a sequence of messages that may be used to provide a communication session initiated by the MS 802 within the architecture 800 of FIG. 20, where one leg is circuit based and one leg is packet based (e.g., VoIP). As shown in FIG. 21, the call flow 900 includes the MS 802, the SIP AS 812, the HSG PRI Gateway 818, the HSG RTP Portal 820, and the MS 804.

The call flow 900 begins in step 902 when the MS 802 sends a SIP INVITE message to the P-CSCF 816. It is understood that SIP messaging may be transferred via the SIP AS 812. The SIP INVITE message contains a SDP packet stipulating a null codec, so that no voice packets are sent over a packet switched network. In step 904, the P-CSCF 816 and RTP Portal 820 perform a handshake to reserve call resources. The P-CSCF 816 then sends a SIP INVITE message containing a SDP packet identifying an RTP portal port number to the MS 804 in step 906. In step 908, the MS 804 responds by sending a SIP OK message containing a SDP packet identifying the MS 804 to the P-CSCF 816. The P-CSCF 816 forwards the SIP OK message containing a SDP packet with a dummy domain name to the MS 802 in step 910. A VoIP bearer leg 912 is established between the MS 804 and the RTP portal 820. In the present example, the VoIP bearer leg 912 is established using a standard VoIP call set-up.

The MS 802 may use native device call setup procedures to initiate a circuit switched call in step 914 through the PRI gateway 818. The PRI gateway 818 sends a SIP INVITE message containing a SDP packet identifying the PRI gateway 818 to the P-CSCF 816 in step 916. In step 918, the P-CSCF 816 sends a SIP OK message identifying the RTP portal 820 to the PRI gateway 818. A VoIP bearer leg 920 is then established between the RTP portal 820 and the PRI gateway 818. As before, the VoIP bearer leg 920 may be established using a standard VoIP call set-up. The PRI gateway 818 sends a call set-up ACK message to the MS 802 in step 922. A circuit switched bearer leg 922 may then be established between the MS 802 and the PRI gateway 818. In step 924, the MS 802 sends a SIP ACK message to the P-CSCF 816, which forwards the message to the MS 804.

Figure 22:
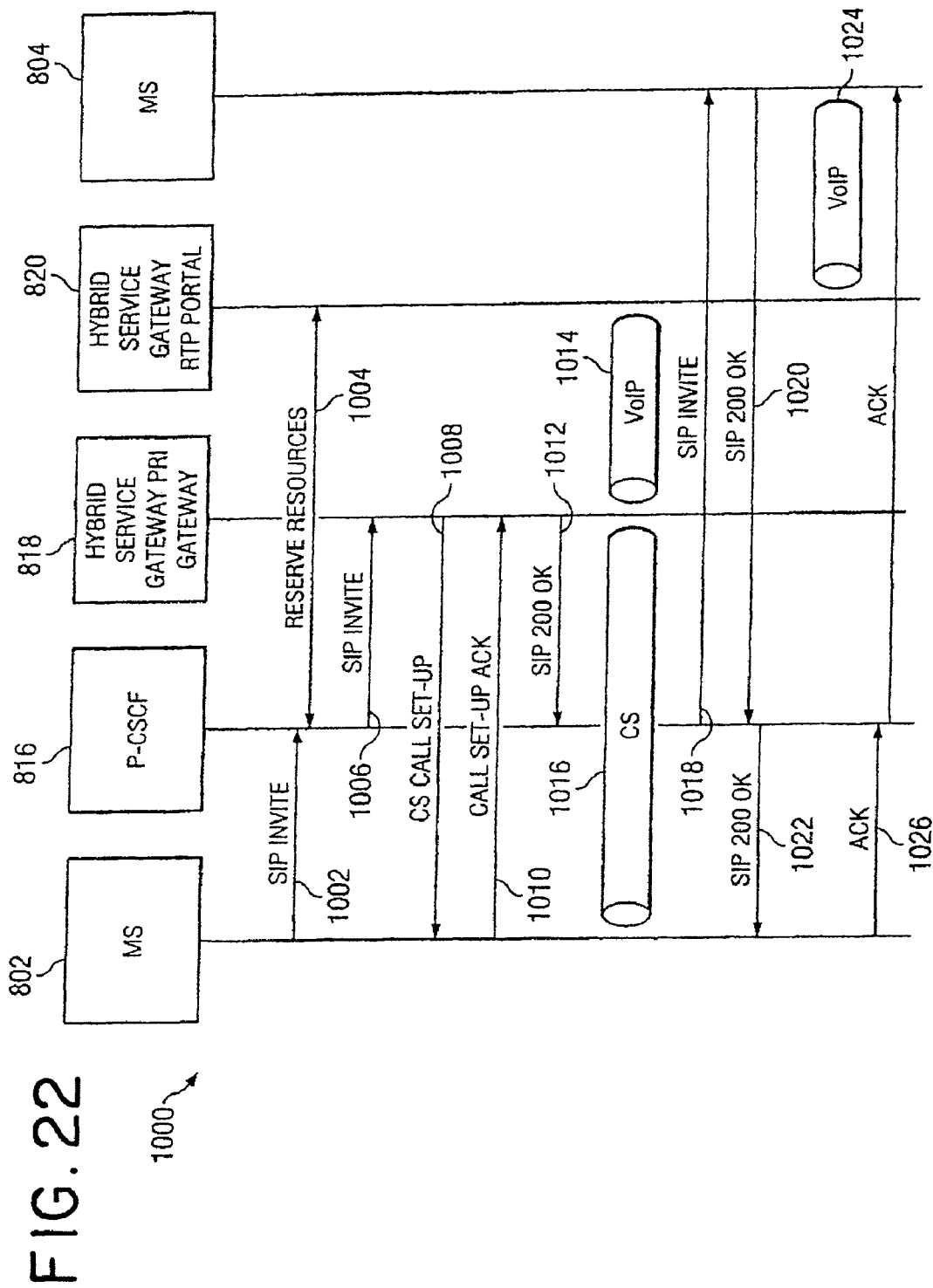
FIG. 22 shows a call flow of a call set-up in which a network initiates a call to a mobile device within the architecture of FIG. 20.

Referring now to FIG. 22 and with continued reference to FIG. 20, a call flow 1000 illustrates a sequence of messages that may be used to provide a communication session initiated by the network to the MS 802 within the architecture 800 of FIG. 20, where one leg is circuit based and one leg is packet based (e.g., VoIP). As shown in FIG. 22, the call flow 1000 includes the MS 802, the SIP AS 812, the HSG PRI Gateway 818, the HSG RTP Portal 820, and the MS 804.

The call flow 1000 begins in step 1002 when the MS 802 sends a SIP INVITE message to the P-CSCF 816. It is understood that the SIP messaging may be transferred via the SIP AS 812. The SIP INVITE message contains a SDP packet stipulating a null codec, so that no voice packets are sent over a packet switched network. In step 1004, the P-CSCF 816 and RTP Portal 820 perform a handshake to reserve call resources. The P-CSCF 816 sends a SIP INVITE message containing a SDP packet identifying the MS 802's domain name and the RTP Portal to the PRI gateway 818 in step 1006. In step 1008, the PRI gateway 818 sends a circuit switched call set-up message to the MS 802, which then returns a call set-up ACK message to the PM gateway 818 in step 1010. The PRI gateway 818 sends a SIP OK message containing a SDP packet identifying the PRI gateway 818 to the P-CSCF 816 in step 1012. A VoIP circuit bearer 1014 is then established between the RTP portal 820 and the PRI gateway 818. In the present example, the VoIP bearer leg may be established using a standard VoIP call set-up. A circuit switched bearer leg 1016 is established between the PRI gateway 818 and the MS 802. In the present example, it may be desirable for the MS 802 to suppress incoming ringing.

In step 1018, the P-CSCF 816 sends a SIP INVITE message containing a SDP packet identifying the RTP portal 820 to the MS 804. In response, the MS 804 sends a SIP OK message containing a SDP packet identifying the MS 804 to the P-CSCF 816. The P-CSCF 816 inserts a dummy domain name into the packet and forwards the SIP OK message to the MS 802 in step 1022. A VoIP bearer path 1024 is established between the MS 804 and the RTP portal 820. The MS 802 sends a SIP ACK message to the P-CSCF 816 in step 1024, which forwards the SIP ACK message to the MS 804.

The above embodiments and the Appendix describe the use of code, within SIP messaging flows, which explicitly signals SIP Circuit Bearer. In an alternative technique, one or more of the SDP packets may include a special codec value to indicate that a circuit bearer is being used, or is required.

In a further development of the invention, there can be some intelligence in choosing the location of the gateway (e.g. MGW 318 in FIG. 3) which bridges the Circuit Bearer and IP bearer legs of the call. Where the circuit and packet switched networks are owned by the same operator the location of the gateway is not so important. However, they can be independently owned as, for example, where the packet switched network is a private network belonging to an enterprise. Users can still access such networks from wireless local or wide area networks using a Virtual Private Network (VPN). In this case, the owner of the private network would wish the gateway to be located as close as possible to the physical location of the user, so that the Circuit Switched leg of the session (which they have to pay another operator for) is as short as possible. This can be achieved as follows. Firstly, the CBCF obtains information from the terminal about it's physical location (using the SIP signalling, if the CBCF is in the network). The CBCF uses a database to look up the PSTN number of the gateway that is nearest to the client. Finally, the CBCF instructs the CBOF to originate a call to a CBTF E.164 number which will route through the chosen gateway to the CBTF. The above works wherever the CBCF, CBOF and CBTF are located. If the CBCF is at the terminal then the CBCF requires a protocol to perform the database lookup. If the CBCF and CBOF are not co-located (e.g. CBCF in network, CBOF at terminal) then the CBTF number is communicated between them, such as by using the modified SDP messages that have been described. In the case of a multinational enterprise network, with gateways in multiple countries, this allows the enterprise's employees to bypass mobile roaming charges, which is a significant advantage.

It is understood that the present disclosure provides for setting up a call using SIP or a similar protocol, and then using circuit switched network elements to provide part of the bearer path. This enables multimedia services, such as those defined by IMS, to be delivered in such a way that a client looking into the network has no knowledge that a circuit switched bearer forms part of the bearer path. This enables such services to be delivered via a network that has not implemented all the specified QoS mechanisms, and aligns the provision of the services with defined standards, such as the 3GPP IMS architecture. Furthermore, this approach permits a simple migration to a full VoIP bearer path as QoS mechanisms are introduced into a network. In addition, this enables the provision of a service control, billing, and authentication architecture that is identical to that proposed in 3GPP IMS or other standards. In the present disclosure, the bearer may be any type of real time, conversational service (e.g. voice, video, gaming sessions, application sharing, etc.).

It is preferred that a terminal is fully adapted to support the SIP Circuit Bearer method just described as this allows the service to be provided in a transparent manner to the network and a user of the terminal. However, it is possible to provide an intermediate level of support for SIP Circuit Bearer by a less capable terminal. If the terminal cannot recognise and silently accept an incoming SIP Circuit Bearer call and transparently associate it with the SIP session, the consequences are as follows. For outgoing calls, after invoking the SIP call, the user will receive an incoming call which they must then answer manually. Locally generated ring-tone (generated by the SIP client) may be overridden by the incoming CS domain call, depending on terminal implementation. As a result, for IMS to IMS calls, in-band ring tone must be provided on the CS call. For IMS to PSTN calls, the PSTN should provide the in-band ring tone. For incoming calls, the user will see an incoming SIP call and an incoming CS domain call. Neither call will be presented to the user until pre-conditions at the originating party are met. Both calls must be manually answered.

While the present disclosure uses 3 GPP GPRS and UMTS technologies for purposes of illustration, it is understood that it may be equally applicable to other technologies, including fixed wireline access, wireless local area network (LAN) access such as 802.11, CDMA (Code Division Multiple Access)/1×RTT (Radio Transmission Technology)/1×EV-DO (Evolution Data Only) access, and/or other technologies.

Accordingly, while the preceding description shows and describes one or more embodiments, it will be understood by those skilled in the art that various changes in form and detail may be made therein without departing from the spirit and scope of the present disclosure. For example, the type of protocols used in the preceding description may vary, and it is understood that substitutions may be made. Similarly, different network configurations may be used for different types of digital devices. Furthermore, terms such as "first leg" and "second leg" are used for purposes of example, and do not necessarily denote a particular sequential or chronological order. In addition, it is understood that messages may be sent to or from different network entities than those shown. For example, although SIP INVITE messages are illustrated as being sent from the MS, a SIP INVITE may be sent to the MS in some embodiments. Therefore, the claims should be interpreted in a broad manner, consistent with the present disclosure.

APPENDIX

Circuit Bearer Control Function (CBCF) Logic

Whilst the call flows above appear rather complex, the Circuit Bearer Control Function logic can be summarised quite simply. The CBCF operates at the level of SDP offers and answers. The SIP messages to use at any given time are determined by the SIP Call State Machine. It is the CBCF logic which defines the CBCF operation, not a particular call flow. The call flows above, therefore, are just examples. In the following overview of the CBCF logic the following ten is are used:

Local user: the local user to whom Sip Circuit Bearer Control functions are provided.
Remote user: the remove VoIP user with whom the session is taking place
Gateway: the gateway providing the VoIP < > Circuit interworking
Local SDP of X: the SDP that the CBCF sends to X
Remote SDP of X: the SDP that X sends to the CBCF
High level CBCF operation:
The CBCF maintains a copy of the local and remote SDP of each of the Local user, Remote user and the Gateway. Whenever a new copy of the Remote SDP of one of these three arrives some CBCF logic is applied. This may result in changes in the Local SDP of one or more users. Any such changes trigger the sending of this new Local SDP to that user.
Intialisation:
The Remote SDP of the Gateway is initialised to indicate a VoIP session with a dummy IP address.
The Remote SDP of the Remote User is initialised to indicate a VoIP session with a dummy IP address.
New call from Local User:
1) Set Local SDP of Gateway to VoIP portion of Remote SDP of Remote User
New Remote SDP from Local User:
1) Remove SIP Circuit Bearer indications from received SDP
2) Add Remote SDP of Gateway
3) Set Local SDP of Remote User to the result
New Remote SDP from Remote User:
1) Remove VoIP portion of received SDP.
2) Set Local SDP of Gateway to this VoIP portion
3) Add SIP Circuit Bearer response (based on gateway status) and set Local SDP of Local User to the result
New Remote SDP from Gateway:
1) Use received SDP to update VoIP portion of Local SDP of Remote User Note: the above is just outline logic, additional procedures for cut-through and for handling provision of in-band ringtone to the originating party over the CS connection (required for non-SCB UEs) may be required.

SDP elements
New SDP elements are defined to indicate that the connection is not a VoIP one, but a CS domain connection. It is also necessary to indicate:

The CS domain establishment direction—we use the a=direction attribute from the comedia draft (http://www.ietf.org/internet-drafts/draft-ietf-mmusic-sdp-comedia-05.txt)
The called and calling party numbers—we define a new network type 'GSTN' and address type 'e164' for use in the c=line of the SDP
An indication that two media lines (the SCB one and a normal VoIP one) are offered as alternatives.

EXAMPLE 1

This example represents an endpoint which is prepared to receive a CS domain call for the audio part of a SIP session.
v=0
o=
s=
c=GSTN e164 447710875525
t=
m=audio 9999 gstn
a=direction: passive

EXAMPLE 2

This example represents an endpoint which is prepared to establish a CS domain call for the audio part of a SIP session and will use IP as normal for an Instant Messaging session according to http://www.ietforg/internet-drafts/draft-ietf-simple-message-sessions-01.txt.
v=0
o=
s=
c=IP IP6 aaaa:bbbb:cccc:dddd
t=
m=audio 9999 gstn
c=GSTN e164 447710875525
a=direction: active
m=message 9999 msrp/tcp message/cpim text/plain text/html

The invention claimed is:

1. A control entity for providing a packet-based multimedia service defined by a telecommunications standard between a terminal and a network, the control entity comprising a machine-readable storage medium containing instructions which, when executed by at least one processor in the control entity, causes the control entity to:
establish both (i) a packet signaling connection between the terminal and the network and (ii) a circuit bearer connection between the terminal and a gateway of the network, wherein the circuit bearer connection is established while maintaining the packet signaling connection;
transfer signaling information for the multimedia service via the packet signaling connection; and
transfer data for the multimedia service via the circuit bearer connection wherein the network does not support packet quality of service (QoS) functionality required by the telecommunications standard.

2. The control entity of claim 1, wherein said machine-readable storage medium also contains instructions which, when executed by at least one processor in the control entity, further cause the control entity to:
receive a signaling message via the packet signaling connection which includes the identity of the network entity towards which the circuit bearer connection should be established; and,
initiate the circuit bearer connection towards that network entity.

3. The control entity of claim 1, wherein said machine-readable storage medium also contains instructions which, when executed by at least one processor in the control entity, further cause the control entity to:
send a notification that the terminal supports a circuit bearer connection;
wait for a response from the network that a circuit bearer connection should be used and, if no response is received,
establish a circuit bearer connection for at least part of the path between the terminal and a called party.

4. The control entity of claim 1, wherein said machine-readable storage medium also contains instructions which, when executed by at least one processor in the control entity, further cause the control entity to, if a response is received from a called party indicating that the called party supports a circuit bearer connection, establish a circuit bearer connection between the terminal and the called party.

5. The control entity of claim 1 wherein the network further comprises a gateway which performs conversion between the circuit bearer connection and a packet-switched bearer, and the control entity is further operable to establish a circuit bearer connection by instructing the gateway to establish a circuit bearer call with the terminal.

6. The control entity of claim 1 wherein the network further comprises a gateway which performs conversion between the circuit bearer connection and a packet-switched bearer, and the control entity is further operable to establish a circuit bearer connection between the terminal and the gateway, and to instruct the gateway to establish a packet-switched bearer for transferring the data between the gateway and a remote party.

7. A control entity for providing a packet-based multimedia service defined by a telecommunications standard between a terminal and a network, the control entity comprising a machine-readable storage medium containing instructions which, when executed by at least one processor in the control entity, cause the control entity to:
establish a packet signaling connection between the terminal and the network;
receive a signaling message via the packet signaling connection which includes the calling line identity of the network entity that will establish a circuit bearer connection between the terminal and a gateway of the network while maintaining the packet signaling connection;
receive an incoming circuit bearer call from that network entity; and,
transfer data for the multimedia service via the circuit bearer connection established between the network entity and the terminal instead of the packet signaling connection established between the terminal and the network, wherein the network does not support packet quality of service (QoS) functionality required by the telecommunications standard.

8. The control entity of claim 7, wherein said machine-readable storage medium also contains instructions which, when executed by at least one processor in the control entity, further cause the control entity to automatically associate the circuit bearer connection with the packet signaling connection using the calling line identity.

9. The control entity of claim 8, wherein said machine-readable storage medium also contains instructions which, when executed by at least one processor in the control entity, further cause the control entity to silently answer the incoming circuit bearer connection.

10. A control entity for providing a packet-based multimedia service defined by a telecommunications standard between a network and a terminal, the control entity comprising a machine-readable storage medium containing instructions which, when executed by at least one processor in the control entity, cause the control entity to:
establish (i) a packet signaling connection between the terminal and the network and (ii) a circuit bearer connection between the terminal and a gateway of the network, wherein the circuit bearer connection is established while maintaining the packet signaling connection;
transfer signaling information for the multimedia service via the packet signaling connection; and
transfer data for the multimedia service via the circuit bearer connection, wherein the network does not support packet quality of service (QoS) functionality required by the telecommunications standard.

11. The control entity of claim 10, wherein said machine-readable storage medium also contains instructions which, when executed by at least one processor in the control entity, further cause the control entity to perform an initial step of determining whether the terminal is capable of supporting the circuit bearer connection.

12. The control entity of claim 10, wherein said machine-readable storage medium also contains instructions which, when executed by at least one processor in the control entity, further cause the control entity to interrogate a subscriber database to determine whether the terminal is capable of supporting the circuit bearer connection.

13. The control entity of claim 10, wherein said machine-readable storage medium also contains instructions which, when executed by at least one processor in the control entity, further cause the control entity to receive an indication from the terminal that it is capable of supporting a circuit bearer connection.

14. The control entity of claim 10, wherein said machine-readable medium also contains instructions which, when executed by at least one processor in the control entity, further cause the control entity to establish a circuit bearer connection by:
sending the terminal a signaling message via the packet signaling connection which includes the calling line identity of the network entity that will establish the circuit bearer connection; and,
causing the network entity to initiate the circuit bearer connection with the terminal.

15. The control entity of claim 10, wherein said machine-readable storage medium also contains instructions which, when executed by at least one processor in the control entity, further cause the control entity to:
send the terminal a signaling message via the packet signaling connection which includes the identity of the network entity towards which the circuit bearer connection should be established.

* * * * *